(12) United States Patent
Brown et al.

(10) Patent No.: US 11,067,511 B2
(45) Date of Patent: Jul. 20, 2021

(54) METHODS AND DEVICES FOR REAL-TIME DETECTION OF FOULING CHEMISTRY

(71) Applicant: THE REGENTS OF THE UNIVERSITY OF COLORADO, A BODY CORPORATE, Denver, CO (US)

(72) Inventors: Joseph J. Brown, Honolulu, HI (US); Omkar D. Supekar, Boulder, CO (US); Victor M. Bright, Boulder, CO (US); Juliet T. Gopinath, Boulder, CO (US); Alan R. Greenberg, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 16/576,553

(22) Filed: Sep. 19, 2019

(65) Prior Publication Data

US 2020/0088647 A1    Mar. 19, 2020

Related U.S. Application Data

(60) Provisional application No. 62/733,543, filed on Sep. 19, 2018.

(51) Int. Cl.
*G01J 3/44* (2006.01)
*G01N 21/65* (2006.01)
(Continued)

(52) U.S. Cl.
CPC .......... *G01N 21/65* (2013.01); *B01D 65/10* (2013.01); *G01N 17/008* (2013.01); *G01N 2021/655* (2013.01)

(58) Field of Classification Search
CPC ............. G01N 21/65; G01N 21/658; G01N 2021/656; G01J 3/44; G01J 3/02
(Continued)

(56) References Cited

U.S. PATENT DOCUMENTS

2002/0162947 A1* 11/2002 Weitekamp ............ G01R 29/12
250/214 R
2017/0160200 A1* 6/2017 Mikami ................... C12Q 1/68

FOREIGN PATENT DOCUMENTS

WO    2016092371 A1    6/2016

OTHER PUBLICATIONS

Singh, et al., "Introduction to Membrane Processes for Water Treatment", Emerging Membrane Technology for Sustainable Water Treatment, Chapt. 2, Elsevier B.V., http://dx.doi.org/10.1016/B978-0-444-63312-5.00002-4, 2016, 15-52.
(Continued)

*Primary Examiner* — Md M Rahman
(74) *Attorney, Agent, or Firm* — Saul Ewing Arnstein & Lehr LLP; Kathryn Doyle; Domingos J. Silva

(57) ABSTRACT

Methods and devices for real-time detection of fouling chemistry are described herein. In one aspect, a method of detecting and characterizing fouling of a membrane used for separation in a fluid-based system can include illuminating the membrane with one or more light sources, collecting Raman spectroscopy data from the membrane, and based on the Raman data, determining at least one selected from the group consisting of: presence or absence of membrane fouling, severity of membrane fouling, and composition of the membrane fouling, where the Raman spectroscopy is selected from the group consisting of Coherent Anti-Stokes Raman Scattering (CARS), Stimulated Raman Scattering (SRS), and spontaneous Raman Scattering.

20 Claims, 25 Drawing Sheets

(51) Int. Cl.
  *B01D 65/10* (2006.01)
  *G01N 17/00* (2006.01)
(58) Field of Classification Search
  USPC .......................................................... 356/301
  See application file for complete search history.

(56) References Cited

OTHER PUBLICATIONS

Smith-Palmer, et al., "In Situ Confocal Raman Microscopy of Hydrated Early Stages of Bacterial Biofilm Formation on Various Surfaces in a Flow Cell", Applied Spectroscopy, vol. 70(2), 2016, 289-301.
Supekar, et al., "Real-Time Detection of Reverse-Osmosis Membrane Scaling via Raman Spectroscopy", Downloaded via Univ of Colorado Boulder on Jun. 29, 2018; DOI: 10.1021/acs.iecr.8b01272 Ind. Eng. Chem. Res. XXXX, XXX, XXX-XXX.

* cited by examiner

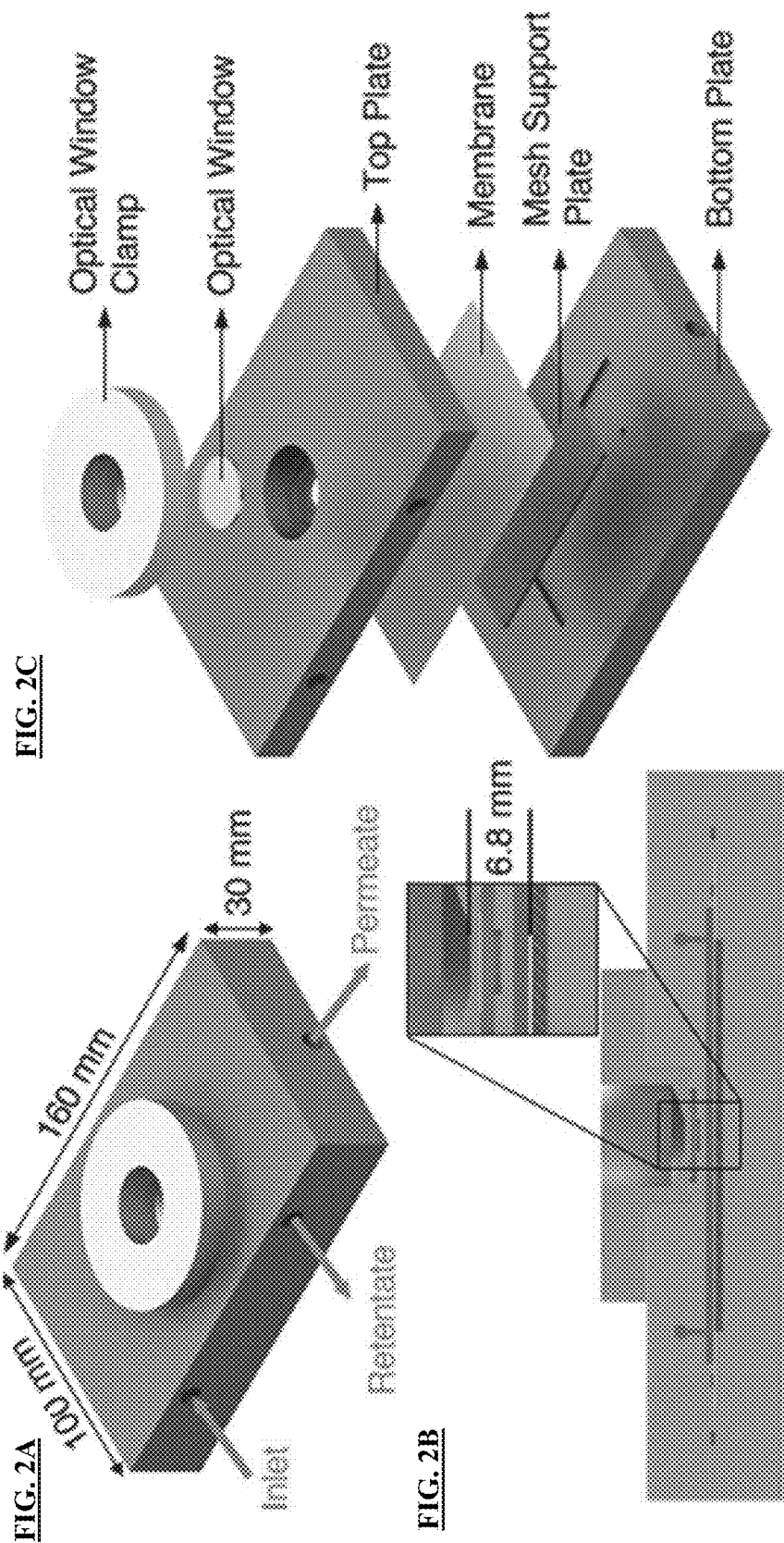

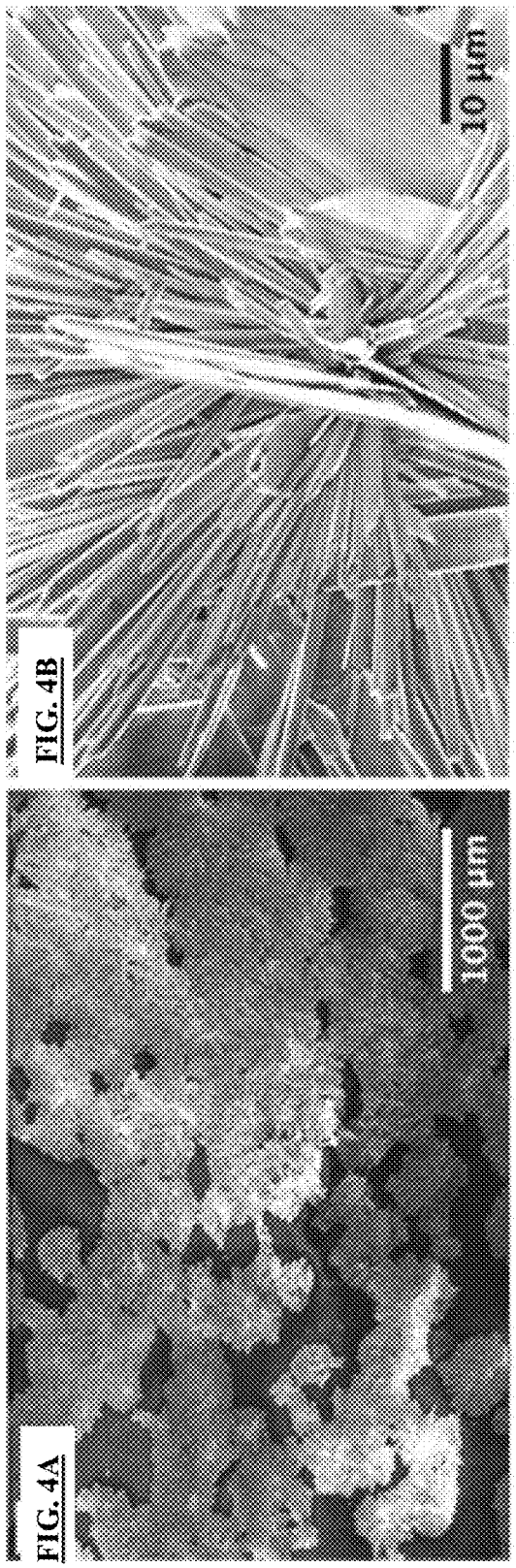
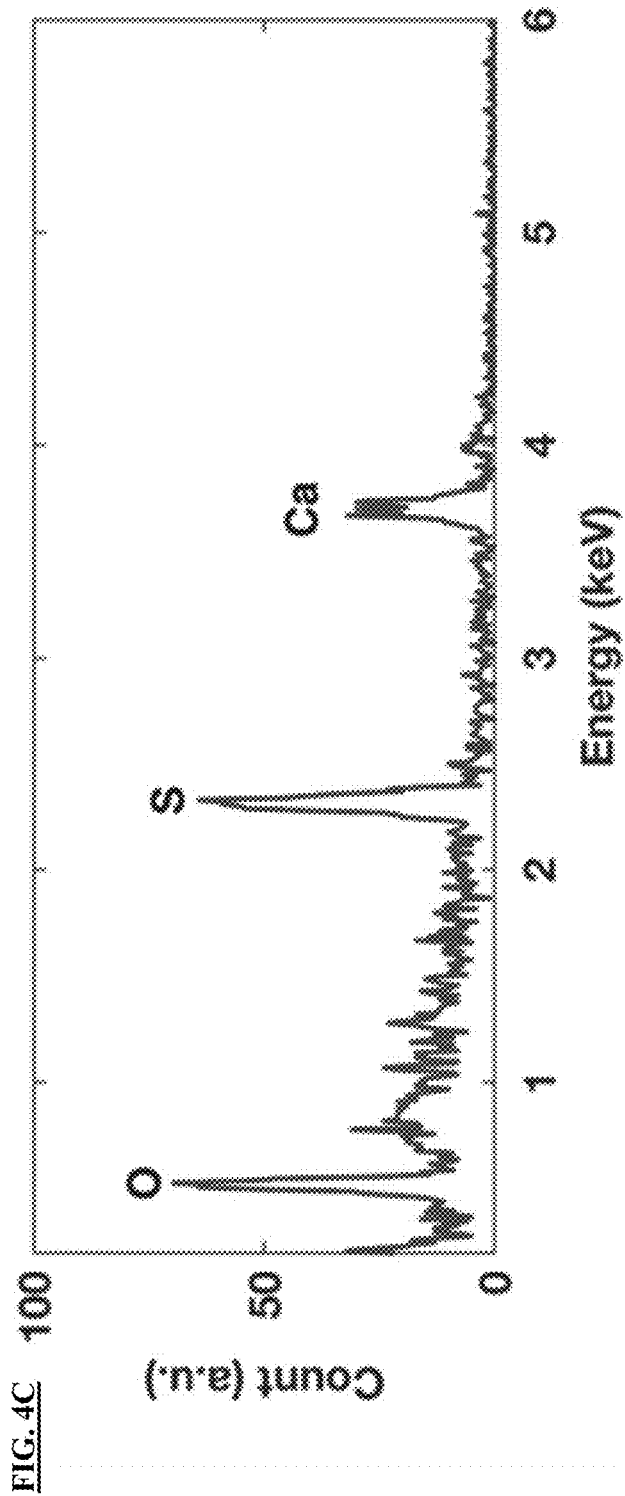
FIG. 4A  FIG. 4B  FIG. 4C

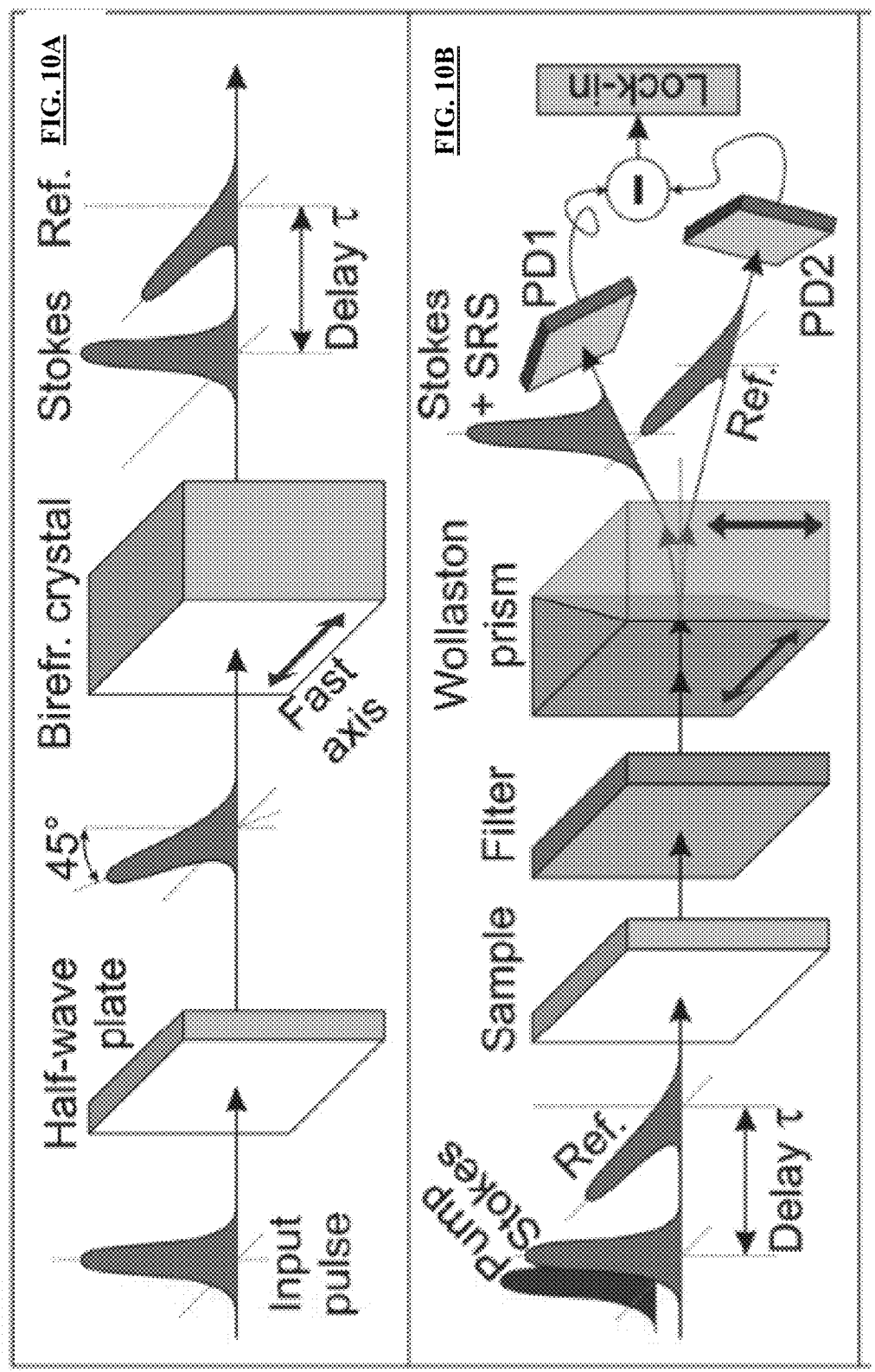

METHODS AND DEVICES FOR REAL-TIME DETECTION OF FOULING CHEMISTRY

CROSS-REFERENCE TO RELATED APPLICATION(S)

This application claims priority under 35 U.S.C. § 119(e) to U.S. Provisional Patent Application Ser. No. 62/733,543, filed Sep. 19, 2018. The entire content of this application is hereby incorporated by reference herein.

STATEMENT REGARDING FEDERALLY SPONSORED RESEARCH OR DEVELOPMENT

This invention was made with government support under grant number 1624602 awarded by the National Science Foundation. The government has certain rights in the invention.

BACKGROUND OF THE INVENTION

Membranes are essential components in many industrial separation applications. However, a major challenge in their use is membrane fouling, which can lead to an increase in operating pressure and/or a decrease in flow rate, resulting in higher energy consumption and operating costs. While pressure and permeate flow are typically monitored during operation to indicate the development of fouling, these metrics provide limited information on the location or chemistry of the foulants.

In membrane-based desalination, concentration polarization usually induces a spatial dependence on the onset and growth of inorganic fouling (scaling) necessitating a real-time, local monitoring technique for optimum scaling detection. One solution is offered by ultrasonic reflectometry (UR), which has been used in conjunction with flow reversal techniques to mitigate the development of scaling during desalination. However, UR provides no chemical information on the foulants. Similarly, many direct observation techniques also lack the capability of providing chemical identification. Other noninvasive fouling detection methods reported in the literature include magnetic resonance imaging, X-ray micro imaging, electrical impedance spectrometry, and streaming potential measurement. However, these methods generally have low spatial and/or temporal resolution, require expensive detection equipment, and/or are limited by the foulants that can be chemically detected.

There remains a need in the art for devices and methods that allow for real-time measurement of thickness and chemical composition of fouling during membrane-based liquid separation systems and gas separation systems. In certain embodiments, these methods and devices can allow for diffraction-limited spatial resolution, chemical quantification of the foulants, and/or early-stage scaling detection. The claimed invention meets these needs.

BRIEF SUMMARY OF THE INVENTION

Methods for real-time detection of fouling chemistry are described herein. In one aspect, a method of detecting and characterizing fouling of a membrane used for separation in a fluid-based (e.g., liquid-based, gas-based) system can include illuminating the membrane with one or more light sources, collecting Raman spectroscopy data from the membrane, and based on the Raman data, determining at least one or more selected from the group consisting of: presence or absence of membrane fouling, severity of membrane fouling, composition of the membrane fouling, and thickness of the membrane fouling, where the Raman spectroscopy method is selected from the group consisting of Spontaneous Raman Scattering, Coherent Anti-Stokes Raman Scattering (CARS) and Stimulated Raman Scattering (SRS).

BRIEF DESCRIPTION OF THE DRAWINGS

For the purpose of illustrating the invention, depicted in the drawings are certain embodiments of the invention. However, the invention is not limited to the precise arrangements and instrumentalities of the embodiments depicted in the drawings.

FIGS. 2A-2C are schematics of a flow cell according to an embodiment of the invention. FIG. 2A is a schematic of the assembled flow cell. FIG. 2B is a section side view showing a 7.5-mm spacing between the optical access port and the membrane. FIG. 2C is an exploded view of the flow cell.

FIGS. 4A-4B are low-magnification (FIG. 4A) and higher-magnification (FIG. 4B) SEM images of the membrane surface, indicating extensive surface coverage and the rosette morphology characteristic of calcium sulfate scaling. FIG. 4C is a graph showing that the scaling was identified as calcium sulfate via energy-dispersive X-ray analysis.

FIG. 5A shows permeate flow rate and relative (1008 $cm^{-1}$) peak intensity, and FIG. 5B shows energy-dispersive X-ray analysis from the region beneath the microscope objective with a corresponding SEM image shown in the inset (scale bar=20 µm).

FIG. 6A is an energy level diagram for spontaneous Raman spectroscopy, where $\omega_1$ is the pump that excites the sample, and the Stokes shifted light ($\omega_s$), is the Raman scattered light that is detected. FIG. 6B is an energy level diagram for coherent anti-Stokes Raman scattering (CARS) where the vibrational oscillators are actively driven at $\theta_p$-$\omega_s$. A blue-shifted $\omega_{as}$ anti-Stokes photon is emitted. FIG. 6C is an energy diagram for stimulated Raman Scattering (SRS). When the difference in photon energy between the pump and Stokes beams matches the energy of a vibrational state of the target molecule, $\hbar\omega_{vib}$, molecules are efficiently excited from the ground state to the corresponding excited state and a pump photon is absorbed (stimulated Raman loss, SRL) and a Stokes photon is generated (stimulated Raman gain, SRG). There is no non-resonant background in SRS and the technique has been demonstrated with shot-noise level sensitivity.

FIG. 10A is a scheme showing in-line balanced SRS using a birefringent crystal to generate Stokes and reference pulse. FIG. 10B is a scheme of the interaction of all three pulses with the sample and subsequent detection with two photodiodes.

(FIG. 18A) permeate flow rate and Raman $CaCO_3$ results; (FIG. 18B) $CaCO_3$ scaling morphology under Raman sensor; and (FIG. 18C) corresponding EDS spectrum from test 10 of Example 4.

(FIG. 20A) permeate flow-rate progression and Raman signal intensity for $CaSO_4$ and $CaCO_3$; (FIG. 20B) an SEM image showing $CaSO_4$ and $CaCO_3$ scaling morphology in location near but not under the sensor; (FIG. 20C) corresponding EDS spectra for $CaCO_3$; and (FIG. 20D) corresponding EDS spectra for $CaSO_4$ from test 13 of Example 4.

(FIG. 21A) an SEM image of the mixed-feed membrane showing $CaCO_3$, $CaSO_4$ scaling, and $CaCO_3$ crystals over $CaSO_4$ crystals; (FIG. 21B) post-mortem spectroscopy results from the 150×100 $\mu m^2$ scans showing $CaCO_3$ relative peak intensity; and (FIG. 21C) post-mortem spectroscopy results from the 150×100 $\mu m^2$ scans showing $CaSO_4$ relative peak intensity from test 13 of Example 4.

DETAILED DESCRIPTION OF THE INVENTION

Figure 1:
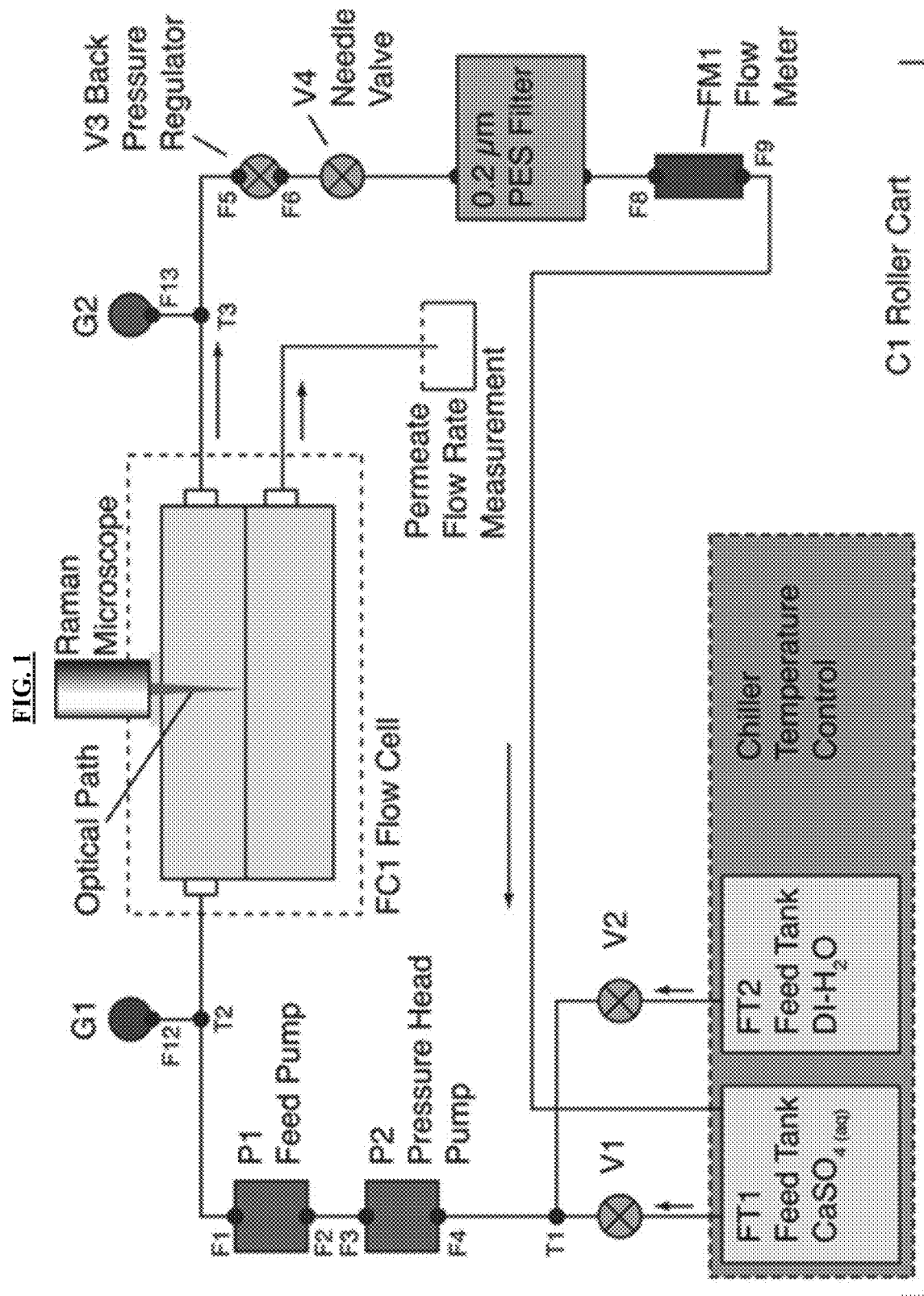
FIG. 1 is a diagram of flow cell instrumentation, according to an embodiment of the invention. G #: gauges; F #: fittings; V #: valves; and T #, T-fittings. The system was operated at 1.17 MPa (170 psi) with feed flow rate varying between 17 and 20 L/hr. The membrane in the system was first compacted by deionized (DI) water for more than 12 hours, and scaling tests were initiated by switching the feed to the $CaSO_4$ solution. A custom bench-scale flow cell was designed such that the Raman microscope was integrated with the flow cell.

The present invention includes novel and cost-effective technologies that can be utilized to design, fabricate, and integrate a powerful, miniaturized sensor for the detection of membrane fouling. The sensor enables measurements that quantify onset of formation and subsequent fouling growth on a membrane via lateral coverage and thickness changes, changes in its chemical composition, morphology, and extent of removal through remediation techniques. The invention provides real-time measurements of thickness and/or chemical composition of fouling during membrane-based liquid separation and membrane-based gas separation.
Methods In one aspect, the invention provides a method for detecting fouling in/on a membrane used for separation in a fluid-based (e.g., liquid or gas) system, in real-time. In another aspect, the invention provides a method of monitoring severity or thickness of fouling of a membrane used for separation in a fluid-based system.

In certain embodiments, the method includes illuminating the membrane with one or more light sources. The method can include collecting Raman data from the membrane. In some cases, the method can include using the collected Raman data to determine at least one property of the membrane selected from the group consisting of: the presence or absence of membrane fouling; the extent and severity of membrane fouling; and the composition of any membrane fouling, if present.

In certain embodiments, the Raman technique used is a Coherent Anti-Stokes Raman Scattering (CARS) technique. In some cases, the CARS technique is implemented using a dual comb laser system. In other cases, the Raman technique used is a Stimulated Raman Scattering (SRS) technique.

In certain embodiments, the Raman technique used is spontaneous Raman Scattering. The spontaneous Raman scattering technique can be implemented using a narrow linewidth laser. The laser can be a pulsed or continuous wave laser. The Raman spectrum from the sample is detected using a spectrometer. Spontaneous Raman detection can be implemented for foulant detection in desalination systems.

In some embodiments, the method includes illuminating the membrane with two pulsed or continuous wave laser light sources, where the two pulsed or continuous wave laser light sources each illuminate the membrane at a different frequency. If the pulsed lasers are used and operate at different repetition rates, the resulting comb lines can have different frequency spacings. Alternatively, the membrane can be illuminated with two laser light sources that are continuous wave, but differ in frequency.

In certain embodiments, the Raman data are collected using at least one spectrometer and at least one camera adapted and configured to collect Raman spectroscopy data. In certain embodiments, the Raman data are processed using Fourier transform. In other embodiments, the Raman data are collected with a photodetector while the frequency difference of the two lasers is scanned.

In certain embodiments, the membrane is illuminated through an optical window that allows transmission of one or more light sources.

In certain embodiments, the membrane fouling is membrane scaling. In other embodiments, the membrane fouling includes deposition on the membrane of at least one material selected from the group consisting of calcium salts, sulfate salts, magnesium salts, sodium salts, potassium salts, barium salts, strontium salts, aluminum salts, iron salts, carbonate salts, hydroxides, fluoride salts, chloride salts, and bromide salts.

In certain embodiments, the membrane fouling includes the deposition of organic materials. In other embodiments, the membrane fouling includes deposition on or in the membrane of at least one material selected from the group consisting of polysaccharides, proteins and lipids.

In certain embodiments, the membrane fouling is biofouling. In other embodiments, the membrane fouling includes deposition of one or more organisms on or in the membrane.

In certain embodiments, the membrane fouling is colloidal or particulate fouling. In other embodiments, the membrane fouling includes deposition of at least one colloidal inorganic species selected from, but not necessarily limited to, the group consisting of colloidal iron compounds, colloidal silicon compounds, and colloidal aluminum compounds.

In certain embodiments, the membrane includes a synthetic polymer selected from the group consisting of, but not limited to, a polyamide, polyether sulfone (PES), polydimethyl siloxane, cellulose acetate (CA), polyacrylonitrile (PAN), polyamides, polyamide-imide (PI), polyethylene (PE), polypropylene (PP), polysulfone (PSf), polytetrafluoroethylene (PTFE), and polyvinylidene difluoride (PVDF). Selected properties of these polymeric membranes may be enhanced by the addition of a nanoparticulate or nanotube filler. Selected properties of these polymeric membranes may also be enhanced via chemical modification of the surface or patterning of the surface.

In certain embodiments, the membrane includes an inorganic material selected from the group consisting of tungsten, palladium, stainless steel, aluminum and titanium. In other embodiments, the membrane comprises at least one selected from the group consisting of a metal oxide, a metal nitride and a metal carbide. In yet other embodiments, the membrane includes a zeolite material.

In certain embodiments, the membrane is a thin film composite (TFC) membrane including a thin active layer formed on a thick porous substrate via interfacial polymerization or other means.

In certain embodiments, the fluid-based system is at least one selected from the group consisting of a water desalination system, a waste water treatment system, a biofiltration system, a gas separation system, a pharmaceutical separation system, a liquid carbon dioxide separation system, and an organic solvent separation system. Such systems may employ one or more microfiltration (MF) membranes, ultrafiltration (UF) membranes, nanofiltration (NF) membranes and hyperfiltration (RO) membranes.

In certain embodiments, the fluid-based system includes at least one element selected from the group consisting of a pressure vessel and a heat exchanger.

Definitions

As used herein, each of the following terms has the meaning associated with it in this section.

Unless defined otherwise, all technical and scientific terms used herein have the same meaning as commonly understood by one of ordinary skill in the art to which this invention belongs. Although any methods and materials similar or equivalent to those described herein can be used in the practice or testing of the claimed invention, exemplary methods and materials are described.

Generally, the nomenclature used herein and the laboratory procedures in membrane chemistry and Raman microscopy are those well-known and commonly employed in the art.

As used herein, the articles "a" and "an" refer to one or to more than one (i.e., to at least one) of the grammatical object of the article. By way of example, "an element" means one element or more than one element.

As used herein, the term "about" is understood by persons of ordinary skill in the art and varies to some extent on the context in which it is used. As used herein when referring to a measurable value such as an amount, a temporal duration, and the like, the term "about" is meant to encompass variations of ±20% or ±10%, more preferably ±5%, even more preferably ±1%, and still more preferably ±0.1% from the specified value, as such variations are appropriate to perform the disclosed methods.

As used herein, the term "fouling" refers to the process whereby a solution or a particle is deposited on a membrane surface or in membrane pores so that the membrane's performance is degraded. Types of foulants can include, for example, colloidal materials, biological materials, organic materials, and/or mineral precipitates. Fouling can be either reversible or irreversible based on the attachment strength of the particles to the membrane and is dependent on the properties of the particle and the membrane.

As used herein, the term 'organism" refers to any life form, such as but not limited to a virus, prokaryote (such as but not limited to a bacterium), eukaryote (such as but not limited to a fungus), or any other life form. In certain embodiments, the organism is a virus, prokaryote, or eukaryote.

As used herein, the term "real-time" refers to the collection and/or analysis of data, or performance of other operations, during the time while a given process is in operation/action.

As used herein, the term "post-mortem" refers to the physical removal of a membrane from a module and subsequent characterization of one or more physical, chemical, or biological properties of the membrane.

Throughout this disclosure, various aspects of the invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

The following abbreviations are used herein: CA, Cellulose acetate; CARS, Coherent Anti-Stokes Raman Scattering; CW, continuous wave; DI, deionized; EDX, energy dispersive X-ray; MF, microfiltration; NF, nanofiltration; PA, Polyamide; PAN, Polyacrylonitrile; PE, Polyethylene; PES, Polyethersulfone; PI, Polyamide-imide; PP, Polypropylene; PS, Polysulfone; PPLN, periodically poled lithium niobate; PTFE, Polytetrafluoroethylene; PVDF, Polyvinylidene difluoride; RO, Reverse Osmosis; SEM, Scanning electron microscopy; SRS, stimulated Raman spectroscopy; UF, ultrafiltration; UR, ultrasonic reflectometry.

Those skilled in the art will recognize or be able to ascertain using no more than routine experimentation, numerous equivalents to the specific procedures, embodiments, claims, and examples described herein. Such equivalents were considered to be within the scope of this invention and covered by the claims appended hereto.

It is to be understood that, wherever values and ranges are provided herein, the description in range format is merely for convenience and brevity and should not be construed as an inflexible limitation on the scope of the invention. Accordingly, all values and ranges encompassed by these values and ranges are meant to be encompassed within the scope of the claimed invention. Moreover, all values that fall within these ranges, as well as the upper or lower limits of a range of values, are also contemplated by the present application. The description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.

Example 1: Real-Time Detection of Reverse-Osmosis Membrane Scaling Via Raman Spectroscopy Bench-Scale Cross-Flow RO System A custom bench-scale separation system integrated with Raman spectroscopy capability was designed and fabricated. This small footprint system is shown in FIG. 1. The system contained two 9-L tanks: one for deionized (DI) water and the other for the aqueous salt solution. The temperature for the feed solutions was controlled at 24±1° C., using a stainless steel heat exchanger connected to a chiller (Model CFT-25, Thermo Neslab). An inline pressure head pump (Model 3-MD-SC, Little Giant Franklin Electric) was connected to the feed tanks in order to eliminate possible cavitation in the high-pressure pump. The pressure head pump was connected to a rotary vane pump (Model TMFRSS051A, Fluid-o-Tech) to provide feed flow at the desired pressure. A backpressure regulator (Model 12-251B2-4AZ5, Neon) and a needle valve (Model SS-1RS4, Swagelok) were installed at the outlet of the flow cell. Two pressure gauges were located upstream and downstream of the flow cell to monitor the inlet pressure and the pressure drop across the flow cell. A flow meter (Model 74C-234G041-421330, King) was connected on the retentate line to monitor the flow through the RO system. An inline filter (Model CCS-020-C1B, 0.2 µm, Advantec) was installed downstream of the flow cell on the retentate line to filter particulates from the feed. Retentate from the flow cell was returned to the feed tank, and the permeate flow was collected in a glass beaker placed on a precision balance (Model PNX-2002, American Weigh Scales). The computer-connected balance recorded the permeate flow rate at 1 min intervals.

The flat-sheet stainless steel membrane flow cell had a top component with a 100 mm long rectangular flow channel (50 mm wide×2 mm thick) with a cross-sectional area of $1.00 \times 10^{-4}$ m$^2$. The top component contained the feed inlet port, retentate outlet port, and a cavity that accommodated a 25.4 mm-diameter optical window (1.5 mm thick), providing optical access to the flow cell for Raman spectroscopy via a 10 mm hole in the center of the flow channel. The optical window was placed in the cavity and sealed with an O-ring using a clamp, which accommodated the microscope objective. The bottom component contained the permeate outlet port, as well as a stainless-steel mesh to support the membrane. The two components were sealed using a double O-ring arrangement to ensure operation at the required pressure. A detailed schematic of the flow cell design and its components is shown in FIGS. 2A-2C.

Prior to the start of each experiment, the flow cell was cleaned with isopropanol and deionized (DI) water, and the RO system was flushed with DI water for 1 h. The membrane used in the experiments was a commercially available brackish water polyamide membrane UTC-73HA (Toray). The membrane was cut to appropriate dimensions (115 mm×65 mm), soaked in a 50% aqueous isopropanol solution for 20 min, and then inserted into the flow cell. Scaling experiments were conducted at a pressure of 1.17 MPa (170 psi) at a flow rate of 17-20 L/h (4.7-5.6 cm/s). For the first part of the experiment, the system was operated with DI water at pressure for at least 12 h to compact the membrane. Once a steady-state flow was achieved, the feed was switched to a calcium sulfate dihydrate (99% Reagent Plus, Sigma-Aldrich) aqueous solution with a concentration of 1.8 g/L. A high concentration of calcium sulfate was chosen to expedite the onset of scaling and decrease the time required for the run. Real-time Raman spectral acquisition was maintained during the experiment.

Integration of Raman Microscope with the Flow Cell

Real-time Raman spectroscopy was conducted using a commercial confocal Raman microscope (model inVia Reflex, Renishaw). The microscope objective (Model N-PLAN L50X, Leica; working distance of 8.2 mm) was integrated with the flow cell through the optical window for access to the center of the flow cell. A 785 nm continuous wave (cw) laser (Model I0785SD0090B-IS, Innovative Photonic Solutions) was used as the excitation source. The laser power from the objective was measured to be ~20 mW. The flow cell was mounted on a high-load-capacity vertical translation stage (Model VAP4, Thorlabs), which enabled the laser to be focused onto the membrane precisely and fix the focus spot with minimum vertical drift over the course of the experiment. The objective focused the beam to a spot of ~3 μm (full width, half maximum) on the focal plane. Spectral acquisition was performed every 5 min until a prominent calcium sulfate Raman peak was observed, and every 10 min thereafter. The acquired spectra contain the Raman peaks and broadband background fluorescence from the membrane. The fluorescence signal was removed from the spectrum, using the baseline removal tool in the Raman microscope software (WiRe 4.4). The signal was then normalized to the most prominent peak intensity of the membrane spectrum near 1150 $cm^{-1}$. The Raman signature of calcium sulfate had prominent peaks at 495, 1008, and 1134 $cm^{-1}$. The presence of scaling during the experiment was confirmed by monitoring the ratio of the strongest calcium sulfate Raman peak at 1008 $cm^{-1}$ and the most prominent membrane peak at 1150 $cm^{-1}$.

Post-Mortem Characterization

Upon completion of each experiment, the flow cell was drained, and the membrane then removed and dried under ambient conditions for at least 24 h. The membrane was sectioned to an area of ~5 $cm^2$ around the center of the membrane for scanning electron microscopy (SEM) (Model JSM 6480-LV, JEOL) and energy dispersive X-ray (EDX) analysis (Model Noran System SIX, ThermoFisher Scientific). Image morphology and corresponding elemental analysis provided confirmation of membrane scaling.

Selected Results

The standard Raman study consisted of four independent experiments. The first experiment continued until the permeate flow rate decreased by ~40%. Three additional experiments were conducted as a time series for which the total run time was systematically varied in order to capture different degrees of scaling in the region interrogated by the sensor. The results are summarized in Table 1 and are arranged in order of decreasing Raman detection time. The data provide a basis for estimating the real-time Raman detection limit during early stage scaling. The experiments were performed under identical initial operating conditions (pressure, feed flow rate, and temperature), but as expected, reflected variability typical for membrane scaling studies. Nevertheless, the data from each experiment indicate a similar relationship between the real-time and post-mortem metrics.

TABLE 1

Summary Metrics for the Four Independent Experiments[b]

| Test | Total run time (min) | Initial permeate flow rate[a] (mL/min) | Net permeate flow rate reduction[a] (%) | Time for $CaSO_4$ Raman peak detection[a,b] (min) | Permeate flow rate reduction at Raman detection[a] (%) |
|---|---|---|---|---|---|
| 1 | 480 | 4.6 | 42.4 | 90 | 8.5 |
| 2a | 86 | 4.7 | 9.4 | 45 | 3.2 |
| 2b | 65 | 5.5 | 24.7 | 30 | 8.2 |
| 3 | 28 | 5.4 | 7.8 | 25 | 11.3 |

[a]Values obtained during operation with calcium sulfate feed solution.
[b]The time for Raman peak detection is defined as that taken to detect a relative $CaSO_4$ Raman peak intensity above 50%.

Test 1 was conducted for 8 h, during which time the permeate flow rate decreased by ~42% during operation with the calcium sulfate feed solution. The initial Raman spectrum obtained during the DI water phase reflected the peaks corresponding to the bonds that characterize the polyamide membrane; subsequently, after switching to the salt solution feed, calcium sulfate peaks at 495 and 1008 $cm^{-1}$ appeared and increased in magnitude through the end of the experiment (see FIG. 3A).

Figures 3A, 3B:
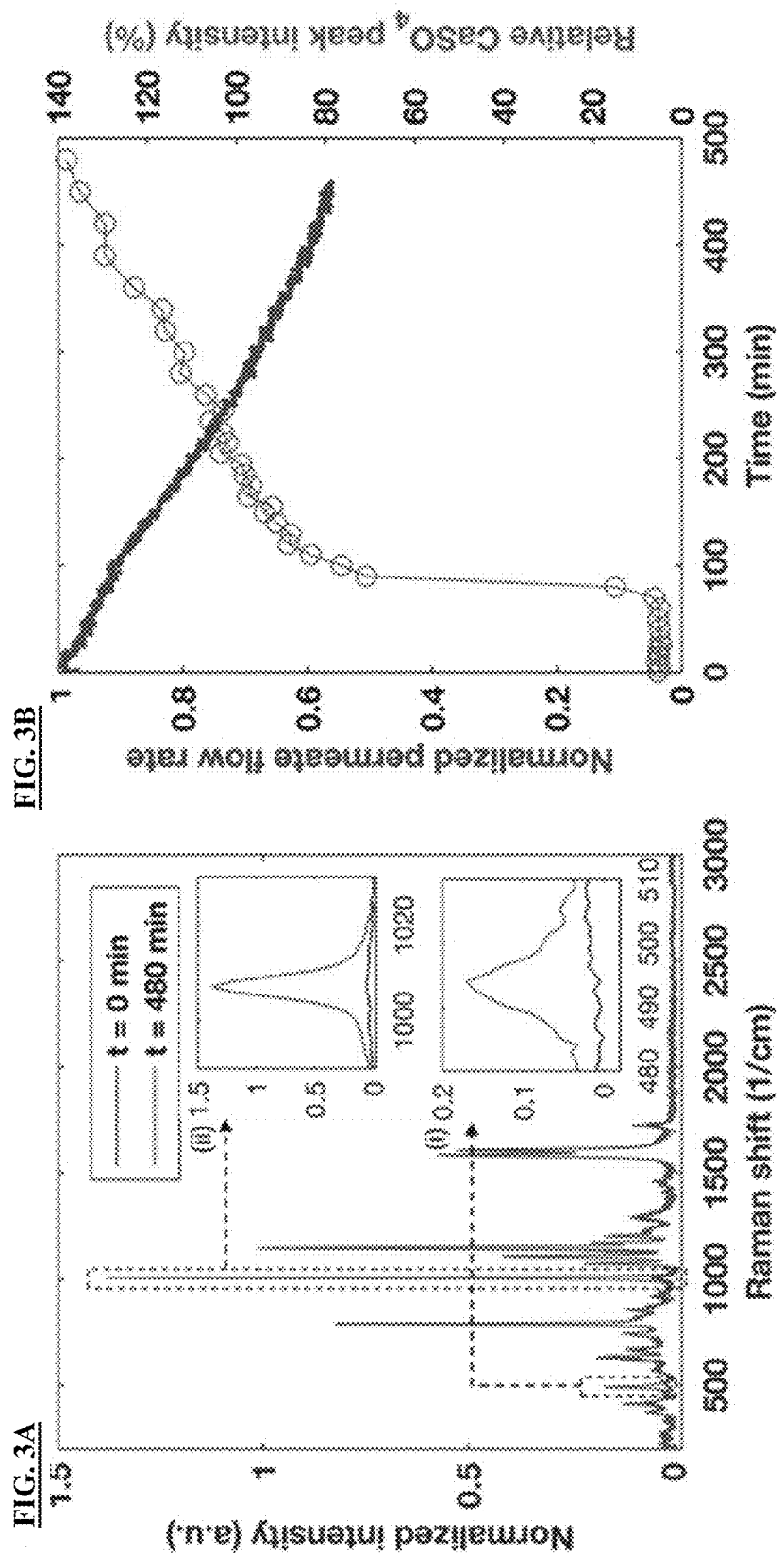
FIG. 3A is a set of graphs comparing the Raman spectra at the beginning (lower line) and at the end (upper line) of test 1 of Example 1. The Raman peaks corresponding to calcium sulfate at (i) 495 $cm^{-1}$ and (ii) 1008 $cm^{-1}$ increased in magnitude relative to those from the membrane.
FIG. 3B is a graph comparing the normalized permeate flow rate and Raman 1008 $cm^{-1}$ peak intensity. The distinct increase in the Raman peak intensity corresponded to a permeate flow rate decrease of ~9%.

FIG. 3B shows the change in permeate flow rate with time and the corresponding response of the relative calcium sulfate Raman peak intensity (1008 $cm^{-1}$). The initial sharp rise in Raman intensity beginning at ~80 min extended through ~100 min and then transitioned to a continued monotonic increase at a relatively constant but distinctly lower rate. During exposure to the calcium sulfate feed solution, the relative peak intensity increased by ~140%. By comparison, the permeate flow rate decreased at an approximately constant rate for a total decrease of ~42% through the end of the experiment.

To confirm that the real-time results were due to scaling, post-mortem analysis of the membrane was conducted. Representative low- and higher-magnification SEM images are shown in FIGS. 4A-4B. The former indicates extensive coverage of the membrane surface while the latter clearly shows the rosette morphology typical of calcium sulfate scaling. X-ray analysis (FIG. 4C) identified the fouling layer as calcium sulfate.

Two time-series tests (2a and 2b, Table 1) were performed to confirm the results obtained for test 1, as well as to explore early-stage scaling detection capabilities. These tests were initiated with predetermined durations of 90 min (test 2a) and 65 min (test 2b), based on results from test 1. These durations corresponded to increases in peak intensity of ~100% and ~150%, compared with decreases in the permeate flow rate of ~9 and ~25%, respectively. Despite some variability in the permeate flow rates, increases in Raman relative peak intensity provided overall real-time characteristics similar to those observed in test 1. SEM and EDX post-mortem results similarly resembled those in FIGS. 4A-4C.

Figures 5A, 5B:
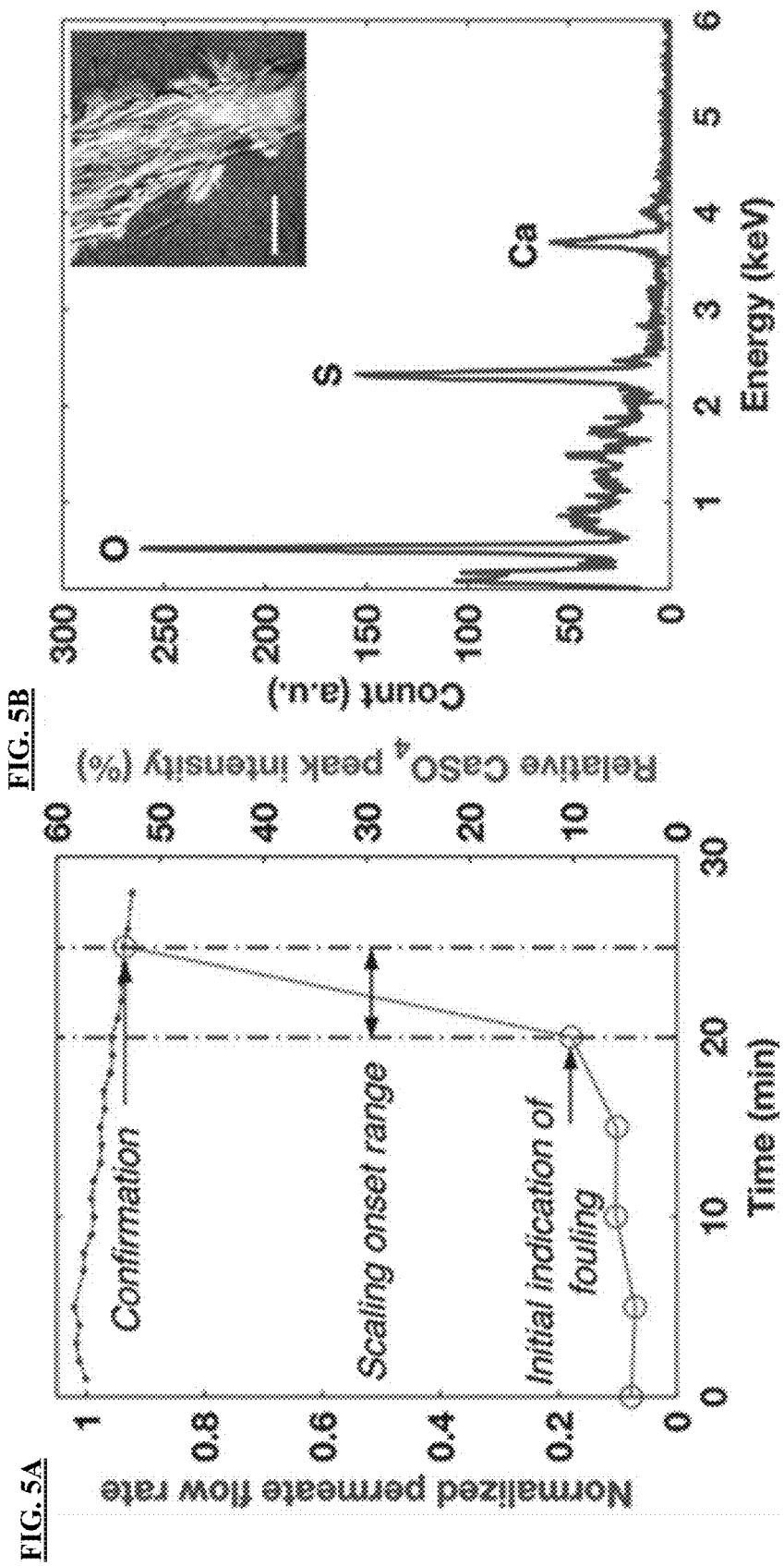
FIGS. 5A-5B are real-time and post-mortem results from test 3 of Example 1, halted at 28 min.
Figures 6A, 6B, 6C:
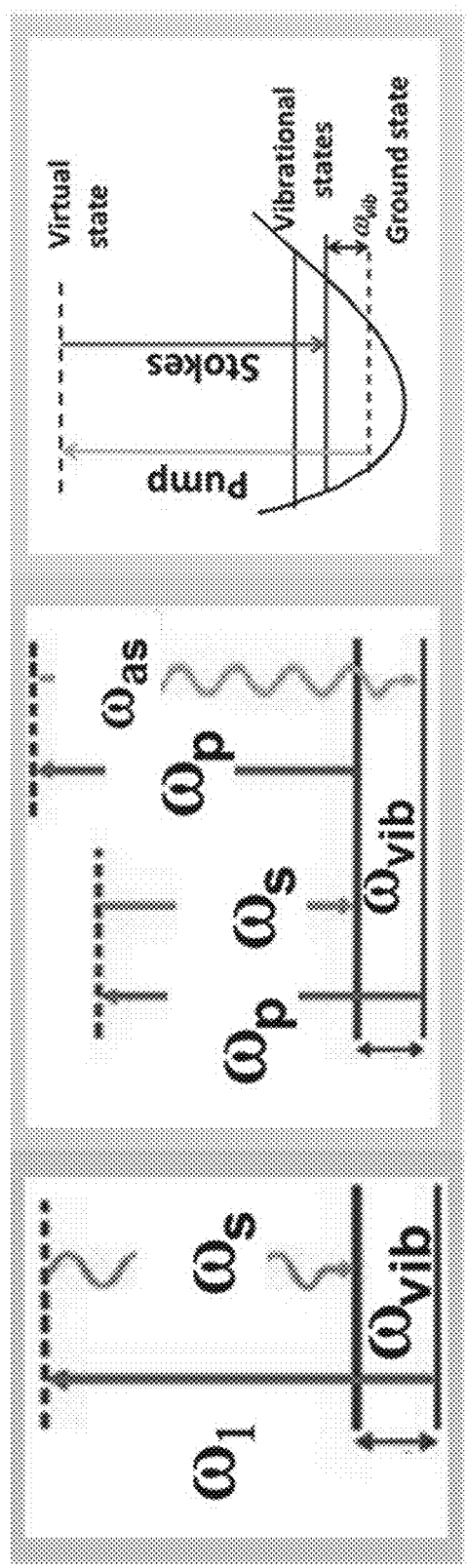
FIGS. 6A-6C are energy level diagrams that illustrate the differences between spontaneous Raman, coherent anti-Stokes Raman scattering (CARS) and stimulated Raman Scattering (SRS).

A third time-series experiment was conducted wherein the test was halted within a few minutes of the initial Raman peak increase so that post-mortem analysis could be conducted close to initial detection. The permeate flow rate and Raman relative peak intensity are shown as a function of time in FIG. 5A. The responses are again similar to those in the other experiments. The increase in peak intensity occurred after ~20 min, at which time the permeate flow rate had decreased by ~4%. The Raman sensing used in these experiments was a point measurement such that the response reflects scaling in only a small area (~7 µm$^2$). Thus, the time at which scaling was first detected was dependent on the locally random nature of initial precipitation in the region around the target coordinates. The post-mortem results presented in FIG. 5B are from the area that encompassed the target coordinates and confirm the potential of Raman spectroscopy for early-stage scaling detection.

Without intending to be limited to any particular theory, the overall decrease in permeate flow rate during flow cell operation was reasonably attributed to membrane compaction, in addition to scaling. The magnitude of compaction was dependent on membrane mechanical and structural characteristics, as well as operational parameters such as pressure. An important advantage of Raman spectroscopy as well as other real-time detection techniques, such as ultrasonic reflectometry, electrical impedance spectroscopy, and direct optical imaging, is that these methods respond to scaling rather than compaction. However, of these techniques, only Raman spectroscopy has the capability to distinguish and chemically quantify the scalants.

Figure 7:
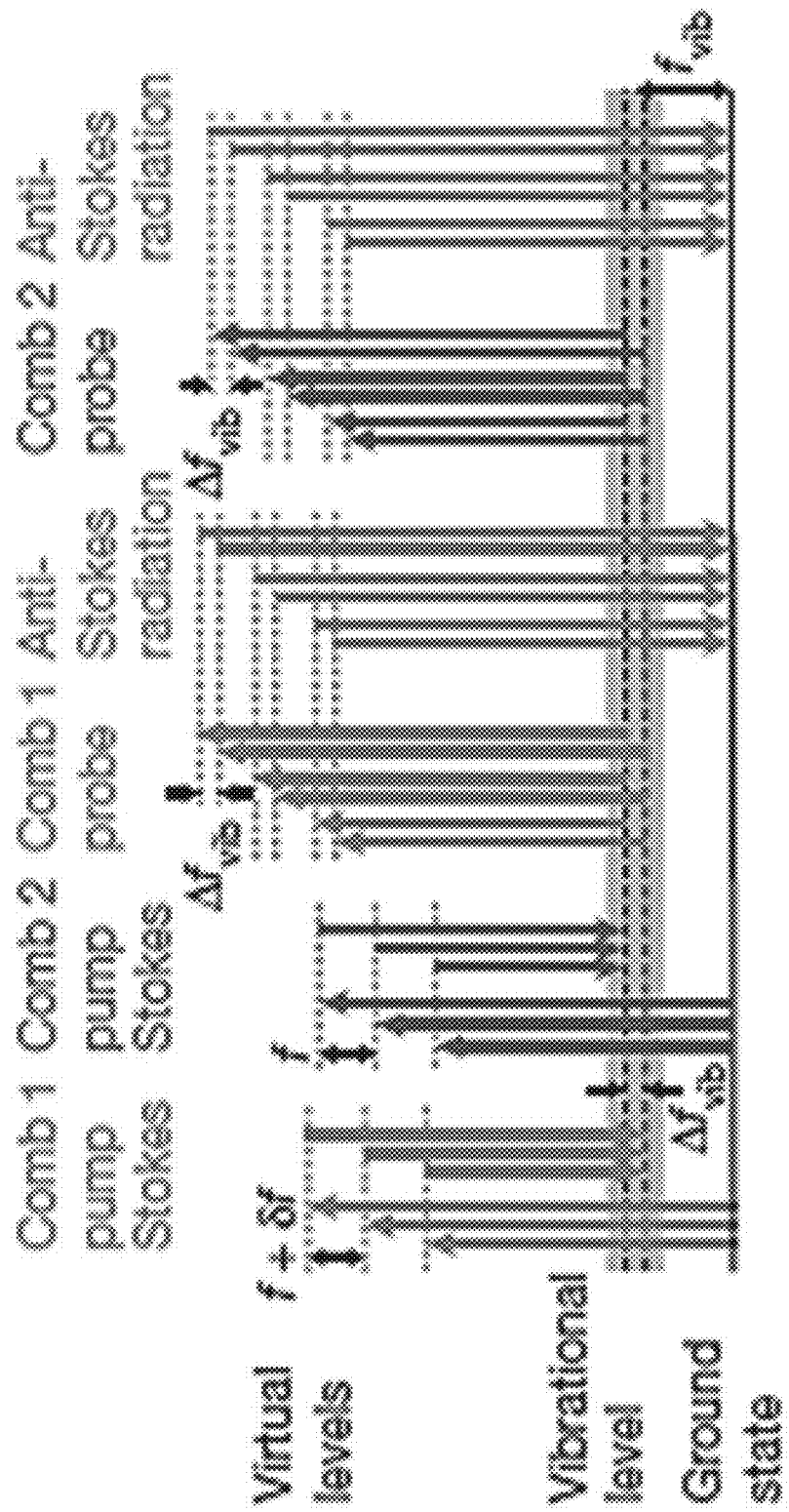
FIG. 7 is a diagram showing the principles of dual comb CARS as originally published in "Coherent Raman spectro-imaging with laser frequency combs", Takuro Ideguchi, Simon Holzner, Birgitta Bernhardt, Guy Guelachvili, Nathalie Picqué & Theodor W. Hänsch, *Nature* volume 502, pages 355-358 (17 Oct. 2013).

Example 2: Dual-Comb Coherent Anti-Stokes Raman Scattering (CARS) for Real-Time Detection of Membrane Fouling Dual-comb Coherent Anti-Stokes Raman Scattering (CARS) uses two short-pulse lasers at repetition rates, $R_1$ and $R_2$, to interrogate a sample. The pulse from the first laser at $R_1$ excites a molecular vibration of period $1/f_{vib}$ (the inverse of the molecular vibration frequency) that produces an oscillation in refractive index. As long as the second pulse arrives within the coherence time of the oscillation, an intensity modulation is produced. In the frequency domain, a ruler of evenly spaced frequencies exists. With two lasers at slightly different repetition rates, this gives rise to two shifted frequency combs. The molecules are excited resonantly, in places where the difference frequencies of the combs match a molecular vibration (see FIG. 7). This enables, with the help of a Fourier transform, a very broad bandwidth for Raman measurements, and complete suppression of the non-resonant background, as well as enhancement of the Stokes signal by many orders of magnitude. The use of CARS also allows for enhanced responsivity, in comparison to spontaneous Raman spectroscopy.

Figure 8:
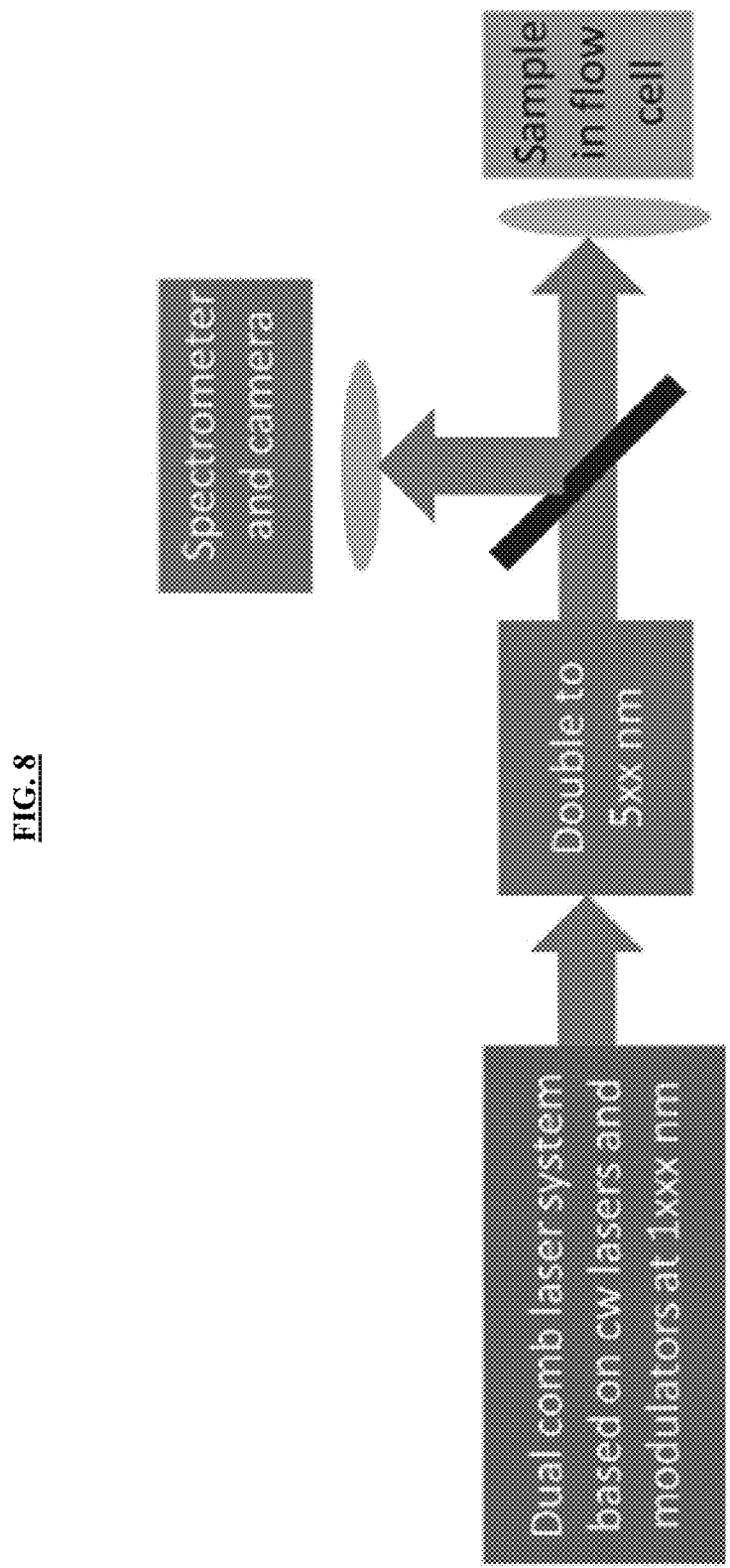
FIG. 8 is a schematic showing a basic dual comb laser system, according to an embodiment of the invention. A dual comb laser system in the 1000 nm range (1xxx nm) is doubled to the 500 nm (5xx nm) range and focused onto a sample. The scattered light is collected and used for dual comb coherent anti-Stokes Raman spectroscopy (CARS).

In one aspect, the invention provides methods for real-time detection of membrane fouling using CARS, substituted for the standard Raman spectroscopy methods described in Example 1. In certain embodiments, the CARS methods of the invention utilize an apparatus as outlined in FIGS. 1 and 8.

Example 3: Stimulated Raman Spectroscopy (SRS) for Sensitive Real-Time Detection of Membrane Fouling As discussed elsewhere herein, standard Raman spectroscopy offers a means for providing real-time chemical analysis of membrane fouling, allowing for detection of changes in bond length on the order of 1 µm. Unfortunately, standard Raman suffers from low optical efficiency, with only one in a million photons undergoing Raman scattering.

In one aspect, the invention provides methods for real-time detection of membrane fouling using stimulated Raman spectroscopy (SRS), substituted for the standard Raman spectroscopy described in Example 1.

SRS is a sensitive method of coherent Raman spectroscopy, where two lasers at different frequencies illuminate the sample, providing significantly enhanced sensitivity and imaging speeds (up to video rate) over spontaneous Raman scattering. When the difference frequency matches the vibrational frequency of particular molecules, the Raman signal is amplified by stimulated excitation. SRS has been demonstrated with shot-noise limited sensitivity. The Stokes (red shifted) wave sees gain (stimulated Raman gain, SRG) and the intensity of the pump experiences a loss (stimulated Raman loss, SRL). SRS only occurs when the frequency difference matches a vibration, meaning that unlike other Raman techniques, non-resonant background is not a problem.

The intensity of the gain and the loss can be described as follows:

$$\Delta I_s \propto I_p I_s N \sigma_{Raman} N \quad (1)$$

$$\Delta I_p \propto -I_p I_s N \sigma_{Raman} N \quad (2)$$

where $I_s$ is the intensity of the Stokes wave, $I_p$ is the intensity of the pump wave, N is the number of molecules in the Stokes volume, and $\sigma_{Raman}$ is the molecular Raman cross-section. The signal is linearly proportional to the number of molecules, but nonlinearly dependent on intensity. This means that three-dimensional axial sectioning can be achieved, similarly to multiphoton microscopy, specifically two-photon, microscopy. Only molecules directly at the focus produce a signal, as intensity falls off very quickly away from this point.

Figure 9:
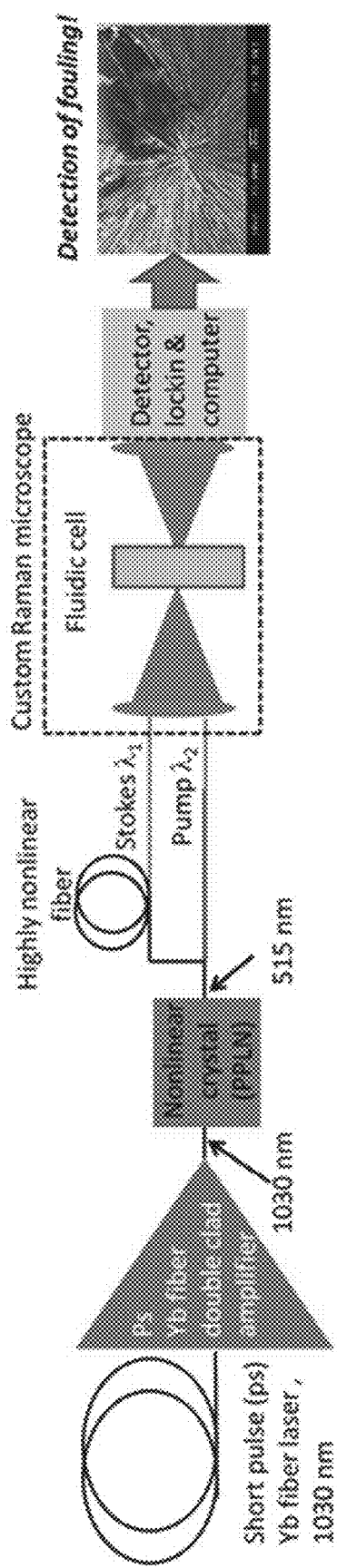
FIG. 9 is a schematic of a stimulated Raman Scattering (SRS) real-time measurement system, according to an embodiment of the invention. A picosecond pulsed Yb fiber laser is amplified in double-clad fiber, doubled to ~500 nm, and split into Stokes and pump. The wavelength is shifted from the pump via propagation through highly nonlinear fiber. Pump and probe are focused into a fluidic cell, and the Raman scattered light is detected with a spectrometer and a camera, to detect membrane fouling. A scanning electron micrograph of a fouled membrane is shown as an example.

The SRS methodology of the invention generates unique data regarding early-stage fouling under realistic conditions and provides important new insight about the onset and progression of fouling in complex separations such as desalination. FIG. 9 illustrates the basic concept, according to an embodiment of the invention.

The experimental set up shown in FIG. 9 is based on standard components, using a fiber laser source. A picosecond pulsed 1030 nm Yb fiber laser is amplified in double-clad fiber, doubled to ~515 nm using a nonlinear crystal (periodically poled lithium niobate, PPLN), and split into two beams. One beam is shifted in wavelength via propagation through highly nonlinear fiber. Both beams are focused into a fluidic cell integrated with a custom inverted, scanning microscope, and the Raman scattered light is detected with a spectrometer and a camera. This scheme allows for a tunable wavelength difference between the two beams, enabling a large variety of vibrational resonances to be interrogated. Scaling experiments utilize an experimental design that incorporates replication, enabling statistical analysis.

In SRS, no new frequencies are generated, but instead, the pump beam experiences loss and the Stokes beam, gain. Changes on the pump or the Stokes are detected via heterodyne detection. By implementing high-frequency modulation, the sensitivity is greatly improved. MHz modulation of the Stokes beam and subsequent lock-in detection can be used to enhance the performance of this technique and measure changes as small as $10^{-7}$ in power. Further enhancements can be obtained with a reference beam that achieves close to shot-noise limited sensitivity. This is implemented with the addition of a birefringent plate to the system that generates a time-delayed, polarization-multiplexed copy of the Stokes light (FIG. 10A). Compared with conventional SRS, enhancements of the signal-to-noise ratio by over 30 dB have been demonstrated, using this method. The sensitivity of SRS has been demonstrated to be superior to that of other Raman methods, using only nanojoule to microjoule pulses for excitation.

Figure 11A:
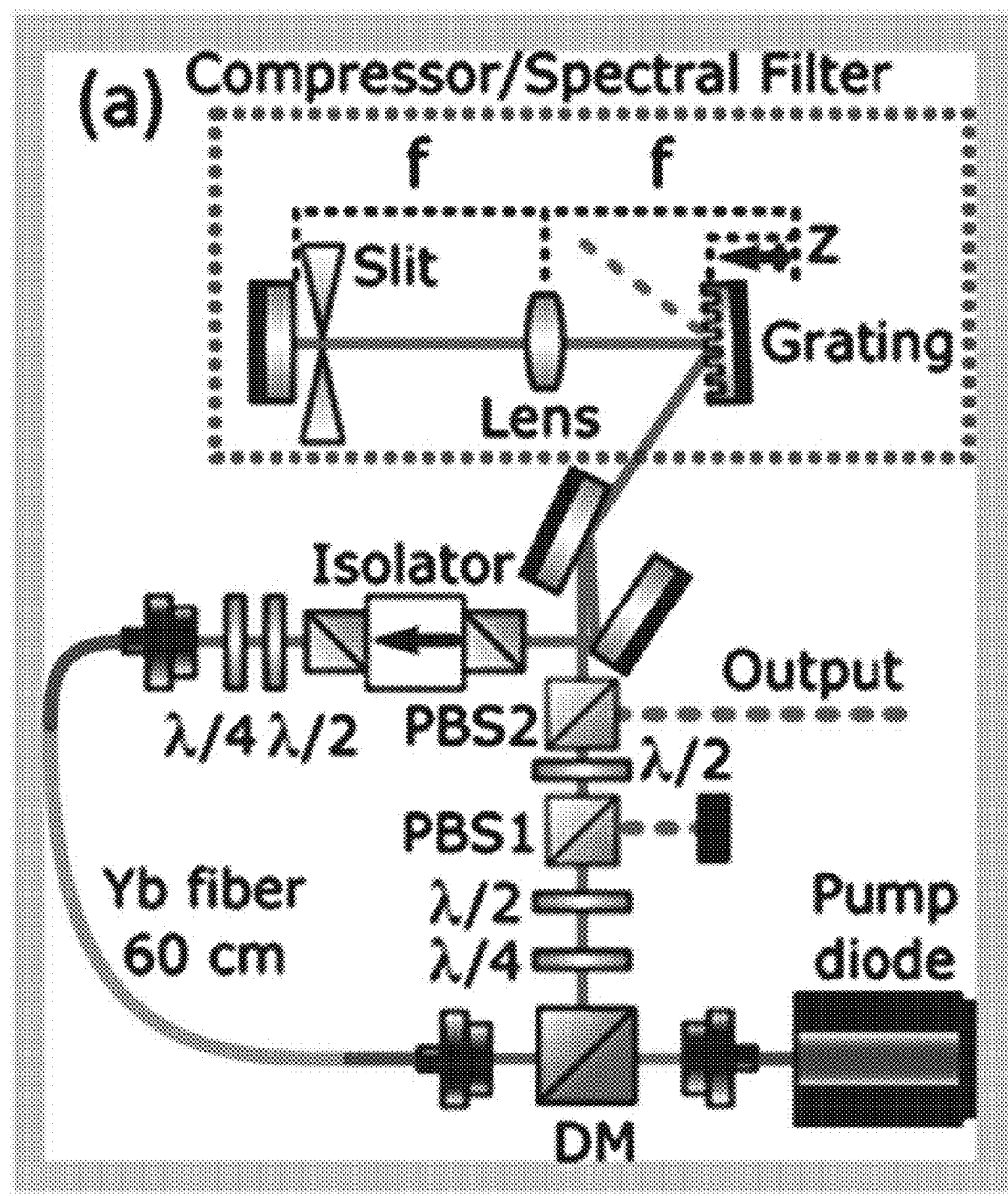
FIG. 11A is a Yb-fiber ring laser schematic. λ/2: half-wave plate; λ/4: quarter-wave plate; PBS1: polarizing beam splitter cube, nonlinear polarization evolution dump; PBS2: polarizing beam splitter cube, laser output; DM: dichroic mirror for pump coupling. Martinez compressor is outlined in blue, grating-lens-slit-mirror. Positive z corresponds to normal dispersion, while negative z corresponds to anomalous dispersion. Setting aperture slit width at mirror provides adjustable spectral filter.
Figure 11B:
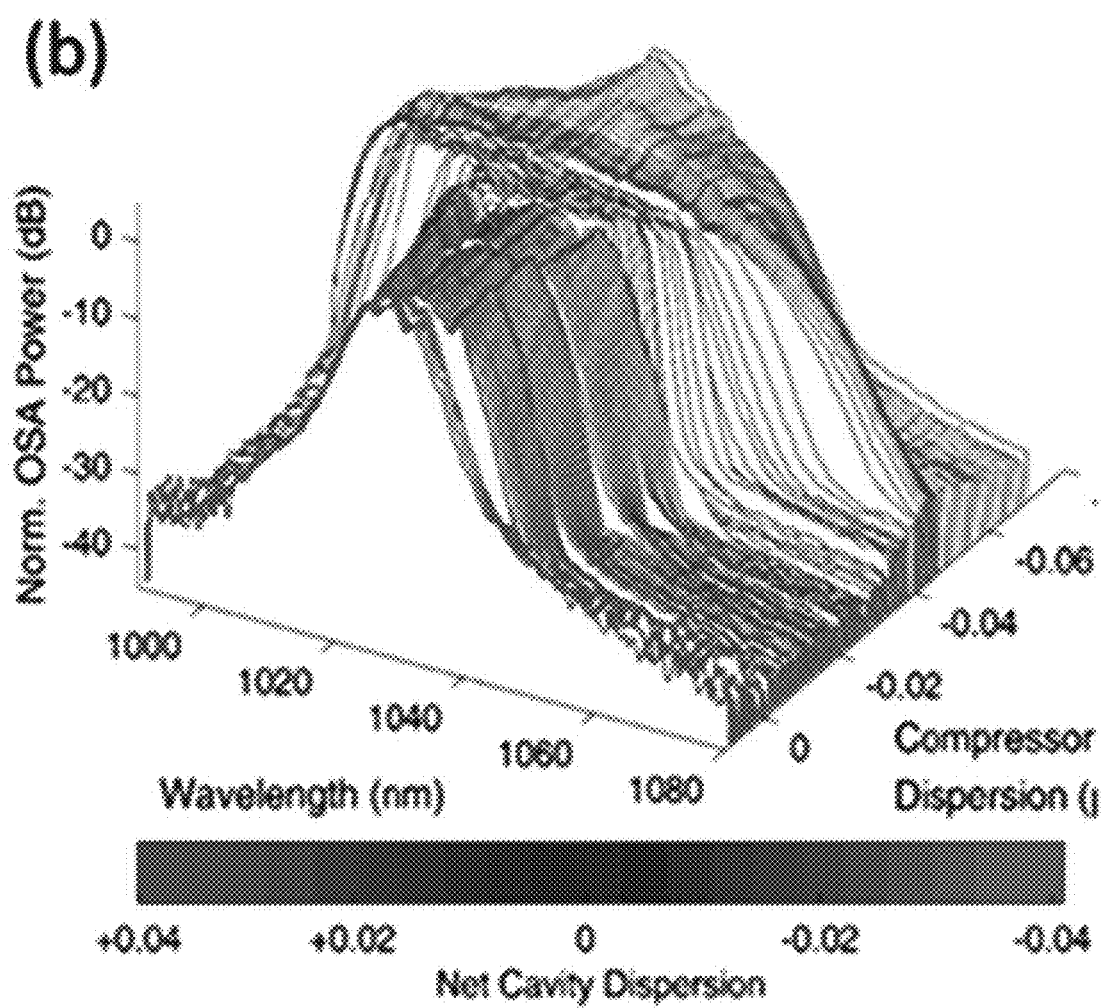
FIG. 11B is a set of mode-locked laser spectra as a compressor dispersion continuously tunes from normal through zero to anomalous dispersion. The spectral filter bandwidth is tuned to maintain mode-locking while maximizing bandwidth at every point. Net normal dispersion is towards the bottom of the plot, while net anomalous is towards the top.
Figure 11C:
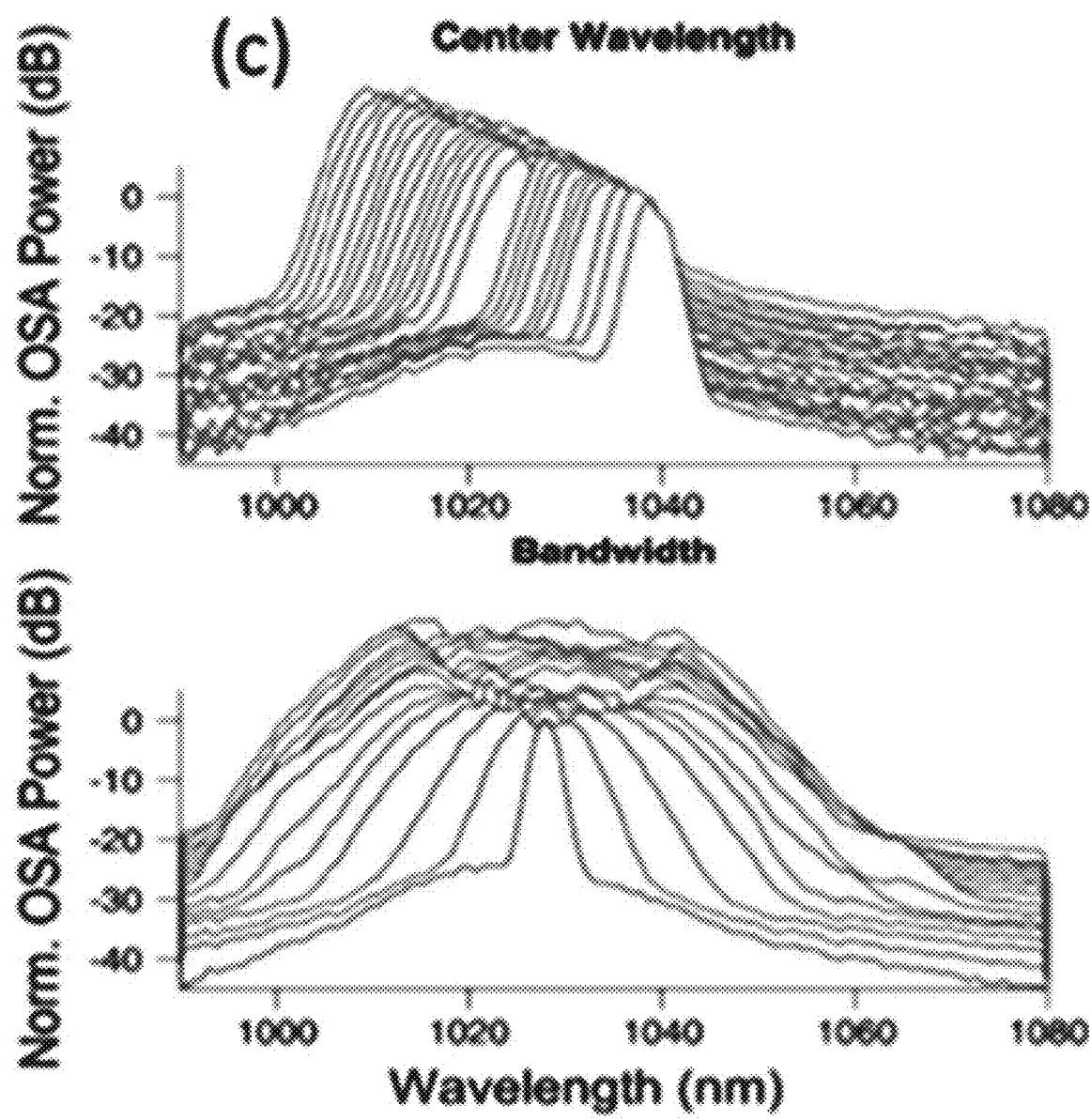
FIG. 11C (Top) is a graph showing that the laser can be tuned from 1011.9 to 1038.8 nm by adjusting the center position of the spectral filter. The laser operates at near zero dispersion at ~0.002 $ps^2$ with a spectral filter bandwidth of 5 nm. At the bottom is a graph showing a spectra as a function of the bandwidth of the spectral filter, ranging from 37 to ~2 nm. The dispersion is the same as in the top graph.

Fiber lasers based on Yb are excellent light sources for SRS. Short-pulsed (ps) Yb fiber laser are used as baseline for stimulated Raman scattering. A laser set to 1030 nm, based on the design shown in FIG. 11A is used to produce hundreds of mW of average power at a repetition rate of 30-80 MHz. The laser contains a Martinez compressor, consisting of a grating, lens, slit and mirror. This element allows control of the laser dispersion while also providing independent control over spectral filtering, via a slit. This allows flexible, pulsed operation ranging from the anomalous to the normal dispersion regimes. Nonlinear polarization rotation is used to mode-lock the laser, producing femtosecond pulses. To boost the power, the pulses are stretched and the laser light is amplified in a double clad optical fiber. For 12 W of pump power and a seed of 10's of mW, 5 W average power is produced, in the form of picosecond pulses at 1030 nm with a repetition rate of 80 MHz. These picosecond pulses enable high peak powers, while still maintaining high resolution. The light is then doubled (from 1030 to 515 nm), in a nonlinear crystal, periodically poled lithium niobate (PPLN), yielding tens of mW at 515 nm. This wavelength has high transmission through water and is well suited to studying desalination membranes. The light is split into two paths—pump and Stokes. The Stokes wavelength is shifted from the pump by passage through a nonlinear fiber and ensuing spectral filter. By changing the amount of power through the nonlinear fiber, the separation in wavelength between pump and Stokes beams is tuned. Thus, the laser design enables a flexible, short pulse source for stimulated Raman spectroscopy with the ability to tune and excite selective molecular vibrations.

A custom Raman scanning microscope adapted and configured for carrying out SRS can be designed to be used with custom flow cells such as those detailed in FIGS. 2A-2C. The set up includes a microscope body, stage, objective, galvo scanner, spectrometer and sensitive camera for real-time detection. The microscope is assembled in an inverted configuration that allows for the ability to scan spatially across a sample and perform both spontaneous and stimulated Raman scattering measurements. The microscope output is sent to a sensitive detector, lock-in amplifier and computer, or spectrometer and sensitive camera. First, spontaneous Raman scattering measurements are performed to test the system with well-known samples as well as quantifying the relative cross-sections of common foulants. Next, stimulated Raman measurements are performed as a function of pump and Stokes wavelengths. The enhancement in detection between the two techniques can be quantified.

The SRS methods utilize a custom membrane flow cell similar to that shown in FIGS. 2A-2C. The-flat sheet module design is specifically suited to optical monitoring. The flow cell is designed to simulate realistic industrial conditions for monitoring membrane fouling. The flow cell can be sufficiently long and contain a continuous optical window or multiple optical windows for Raman microscope integration to enable study of membrane fouling both upstream and downstream. These critical features address the non-uniform nature of scaling due to concentration polarization. Additionally, laser scanning from the microscope provides spatial information on the extent of fouling. This also enables the ability to study the effect of multi-component feeds and the ensuing spatially varying deposition of components. A schematic of the flow cell system is shown in FIG. 1. The pumps provide a high pressure, low flow-rate feed to the flow cell. The feed pressure and flow rate are controlled by a back-pressure regulator and a needle valve, respectively. An inline porous filter is included in the system to filter large particulates from the feed. The feed tanks are temperature controlled using a chiller to eliminate the effects of temperature variation on fouling growth.

Figure 23B:
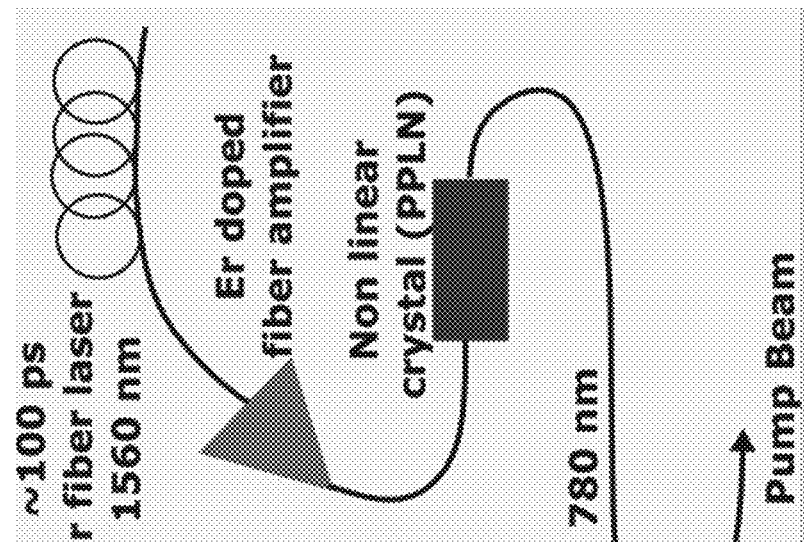
FIGS. 23A-23B depict a Fourier-domain mode-locked laser (FDML) and a pulsed laser pump source for SRS according to an embodiment of the claimed invention.
Figure 23A:
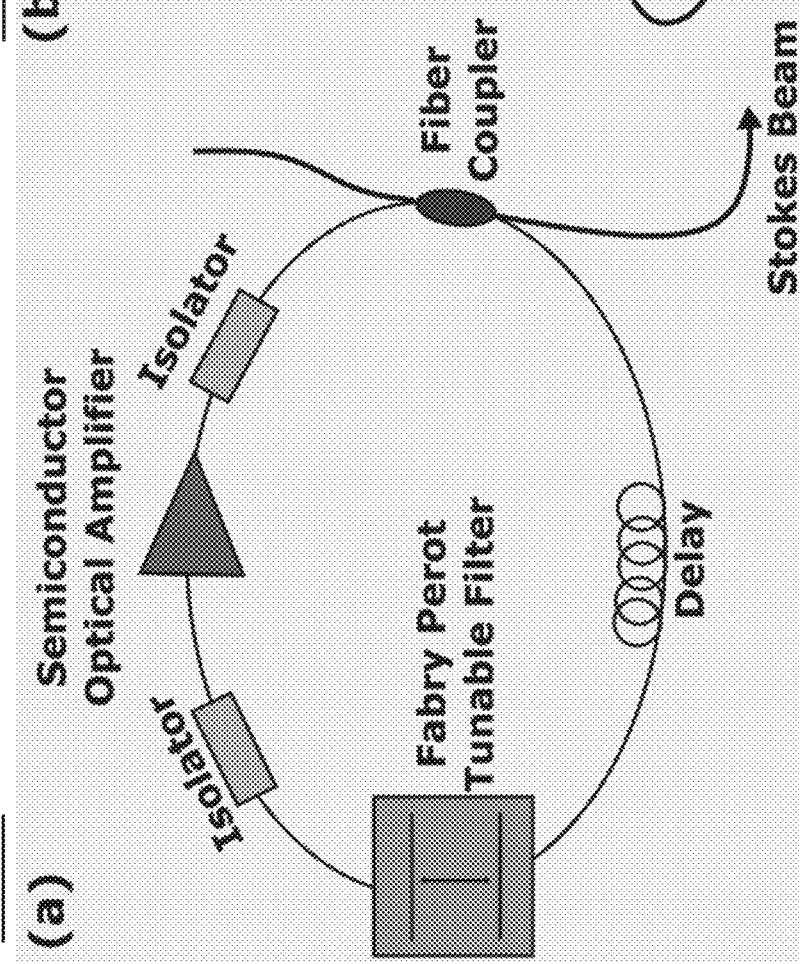

FIGS. 23A and 23B depict a Fourier-domain mode-locked laser (FDML) and a pulsed laser pump source for SRS according to an embodiment of the claimed invention.

The laser system for the stimulated Raman microscope can includes a FDML with a wavelength sweep between 800 and 900 nm as the Stokes laser, and a picosecond Er-doped fiber laser frequency doubled to act as the pump laser at 780 nm (FIG. 23A). The FDML laser (FIG. 23B) provides a wavelength swept laser source with the wavelength of the laser output encoded as a function of time. When the frequency difference between the FDML and the pump laser corresponds to a vibrational or rotational transition of the sample, the pump beam would experience a loss of intensity while the Stokes beam would experience an increase in intensity. The Raman spectrum can be recorded as time dependent intensity variation of the Stokes beam (frequency of the Stokes beam as a function of time) using a photodetector. This is the basis behind the time-encoded (TICO) Raman concept.

Figure 12:
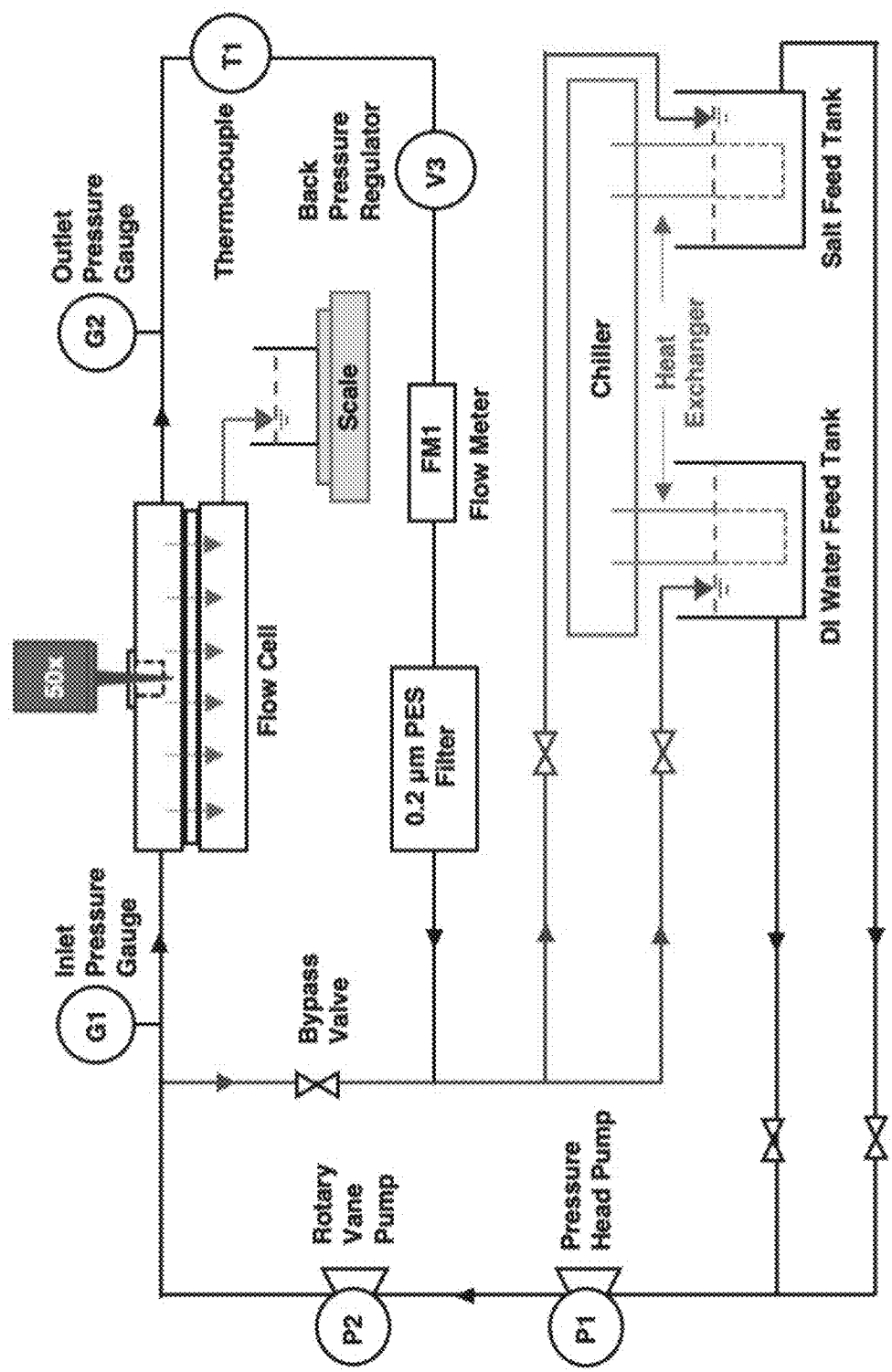
FIG. 12 is a cross-flow reverse osmosis system used in the detection of chemical fouling in accordance with an embodiment of the claimed invention.

Example 4: Raman Scattering for Real-Time Detection of Multiple Scalants in Membrane Fouling The bench-scale membrane flow-cell system is adapted from the system implemented in Example 1. The flow cell is integrated with a Renishaw inVia Raman Microscope for in situ, real-time detection of membrane scaling (FIG. 12). The system is comprised of two 9-L feed tanks: one for a DI-$H_2O$ feed and the other for the salt feed. When the system is in operation, the feed tank is kept at a temperature of 23.5±0.5° C. using a heat exchanger and a chiller (T257P Precision Chiller, ThermoTek). An inline pressure head pump (Model 3-MD-SC, Little Giant Franklin Electric) was installed to avoid potential cavitation in the high-pressure rotary vane pump (Model TMFRSS051A, Fluid-o-Tech) that maintained the system at a pressure of 1.2 (±7×$10^{-3}$) MPa (175±1 psi). A pressure gauge was installed at the inlet and another at the outlet of the flow cell to measure the pressure drop of the feed solution. A thermocouple measured the temperature of the retentate. A back-pressure regulator (Model 12-251B2-4AZ5-72, Neon) controlled the pressure of the system, and a flow meter (Model 74C-234G041-421330, King) and a bypass valve (Model SS-1RS4, Swagelok) were used to monitor and control the flow rate of the system, respectively. An inline filter (Model CCS-020-C1B, 0.2 μm, Advantec) downstream of the flow cell filtered any large particulates in the feed, and the permeate was collected in a glass beaker situated on a scale (Model PNX-2002, American Weigh Scales) for mass measurements at one-minute intervals.

Figure 13A:
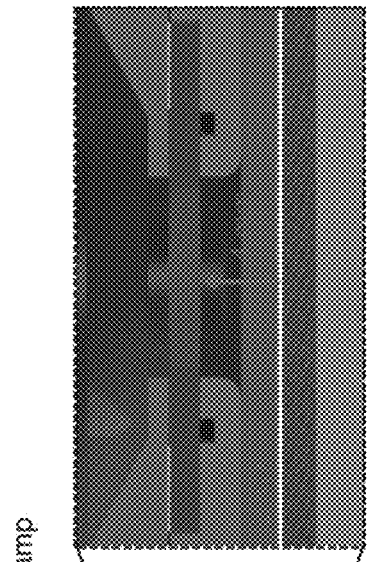
FIG. 13A is a cross-section of the flow cell showing the top and bottom components, and the optical clamp for the microscope objective.
Figure 13B:
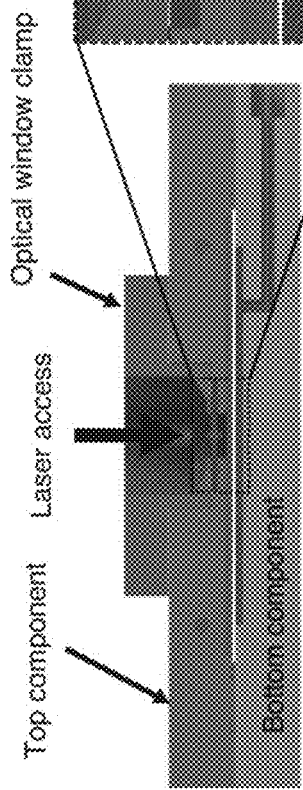
FIG. 13B is a schematic of the flow cell having a channel height of 2 mm, and the channel height under the sensing region is 4 mm.
Figure 13C:
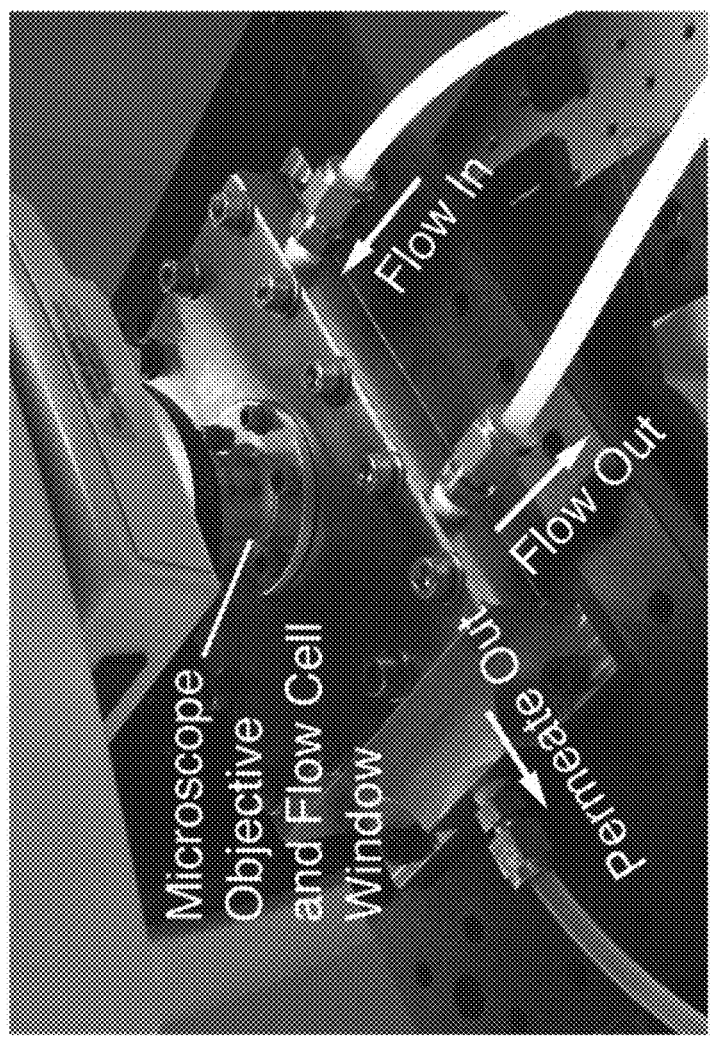
FIG. 13 C is an image of the flow cell in operation. The Raman microscope is integrated with the flow cell using Leica N-PLAN L50x/0.50 objective.

The flow cell shown in FIGS. 13A-13C consists of top and bottom components machined from stainless steel and sealed with a double O-ring arrangement for high-pressure operation. Two ports on the top component serve as the feed inlet and outlet. The top component also contains a cavity that accommodates the optical window clamp to facilitate laser access to the membrane. The port on the bottom plate contains the permeate port. The membrane is supported by a stainless steel mesh and sandwiched between the lower and upper plates.

Prior to each experiment, the DI water and salt feed tanks were washed with RO water until a conductivity of 0.5 to 1.0 μS/cm was achieved. The concentration prepared for the $CaSO_4$ feed was 1.8 g/L $CaSO_4 \cdot 2H_2O$, and the concentration of $CaCO_3$ feed was prepared by combining 3.02 g $NaHCO_3$, 2.66 g $CaCl_2$ and 8 L of $DI-H_2O$. To prepare the $CaSO_4$ and $CaCO_3$ mixed feed, 3.02 g (4.5 mM) $NaHCO_3$ and 2.66 g (3 mM) $CaCl_2$ were added to an 8 L $CaSO_4$ (1.8 g/L concentration) solution right before the start of the experiment to avoid premature precipitation. The commercial TFC RO membrane (UTC-73HA, Toray) was cut to size (115×65 mm) and soaked in a 50% isopropanol aqueous solution for 30 min, and the flow cell was cleaned with DI water and isopropanol. In order to obtain a steady-state flow rate and capture the compaction behavior of the membrane, the membrane was placed in the flow cell and subjected to DI water at 1.2 MPa for at least 15 h.

Scaling Detection Using a Raman Microscope

The Raman microscope (Model inVia Reflex, Renishaw) integrates with the optical window positioned in the center of the flow cell. The laser beam (Model I0785SR0090B-IS1, Innovative Photonic Solutions) has a wavelength of 785 nm and a power of ~20 mW, and is focused onto the surface of the membrane through a microscope objective (Model N-PLAN L50x/0.50, Leica Germany). After the multi-hour exposure to DI water, the scaling experiments are initiated by switching the feed to the desired salt solution, accompanied by real-time permeate mass measurement and Raman spectra acquisition.

Post-Mortem Characterization

After each complete scaling experiment, the membrane is removed from the flow cell and dried for scanning electron microscopy (SEM) (Model JSM 6480-LV, JEOL) and energy-dispersive X-ray spectroscopy (EDS, Model Noran System SIX, ThermoFisher Scientific). Scaling morphology from SEM imaging and elemental analysis using EDS was used to confirm the presence of membrane scaling and the accuracy of Raman chemical identification.

Results and Discussion

This Example consists of 13 independent experiments with four different feed solutions. The first three experiments were replicate runs using DI water as the feed solution. These experiments served as proof that the scaling detection methodology did not yield false positives. In addition, these baseline experiments quantified the permeate flow-rate decrease due to membrane compaction over a period of three hours. The second set of experiments consisted of six runs with a feed solution concentration of 1.8 g/L $CaSO_4 \cdot 2H_2O$, with three replicate runs conducted using aged membranes (tests 4-6), and another three using new membranes (tests 7-9). The Raman spectroscopy scaling detection methodology captures the different scaling dynamics of the aged and new membranes, which are influenced by the permeate flow rate of each membrane. The third feed solution employed was a supersaturated $CaCO_3$ feed consisting of a mixture of 4.5 mM $NaHCO_3$ and 3 mM $CaCl_2$ solutions (tests 10-12). These experiments provided initial proof of concept regarding the $CaCO_3$ scaling detection capability of the methodology. Finally, a mixed-component feed solution consisting of 1.8 g/L $CaSO_4$, 4.5 mM $NaHCO_3$ and 3 mM $CaCl_2$ was utilized, revealing the spatial dependence of the detection method. The chemical identification accuracy of the Raman detection method was confirmed by energy-dispersive X-ray spectroscopy (EDS). A detailed description of these scaling detection experiments is provided in the following sections.

DI Water Feed Experiments

The mechanical behavior of polymeric thin-film composite reverse osmosis (TFC-RO) membranes can be described by viscoelastic models. The permeate flow-rate decrease recorded in the DI water feed experiments can be expressed as an exponential function, indicating a time dependence of membrane performance attributed to deformation of the polymer matrix. To quantify this effect on the membranes used in this work, three independent 3 h experiments were conducted using a DI water feed with Raman detection. The results from these experiments are summarized in Table 2.

TABLE 2

Summary of DI water experimental runs.

| Test # | Total run time (min) | Initial permeate flow rate (ml/min) | Net permeate flow rate reduction (%) | $CaSO_4$ detection | $CaCO_3$ detection |
|---|---|---|---|---|---|
| 1 | 178 | 7.0 | 12.8 | No | No |
| 2 | 183 | 6.0 | 6.9 | No | No |
| 3 | 185 | 4.7 | 2.9 | No | No |

Figure 14:
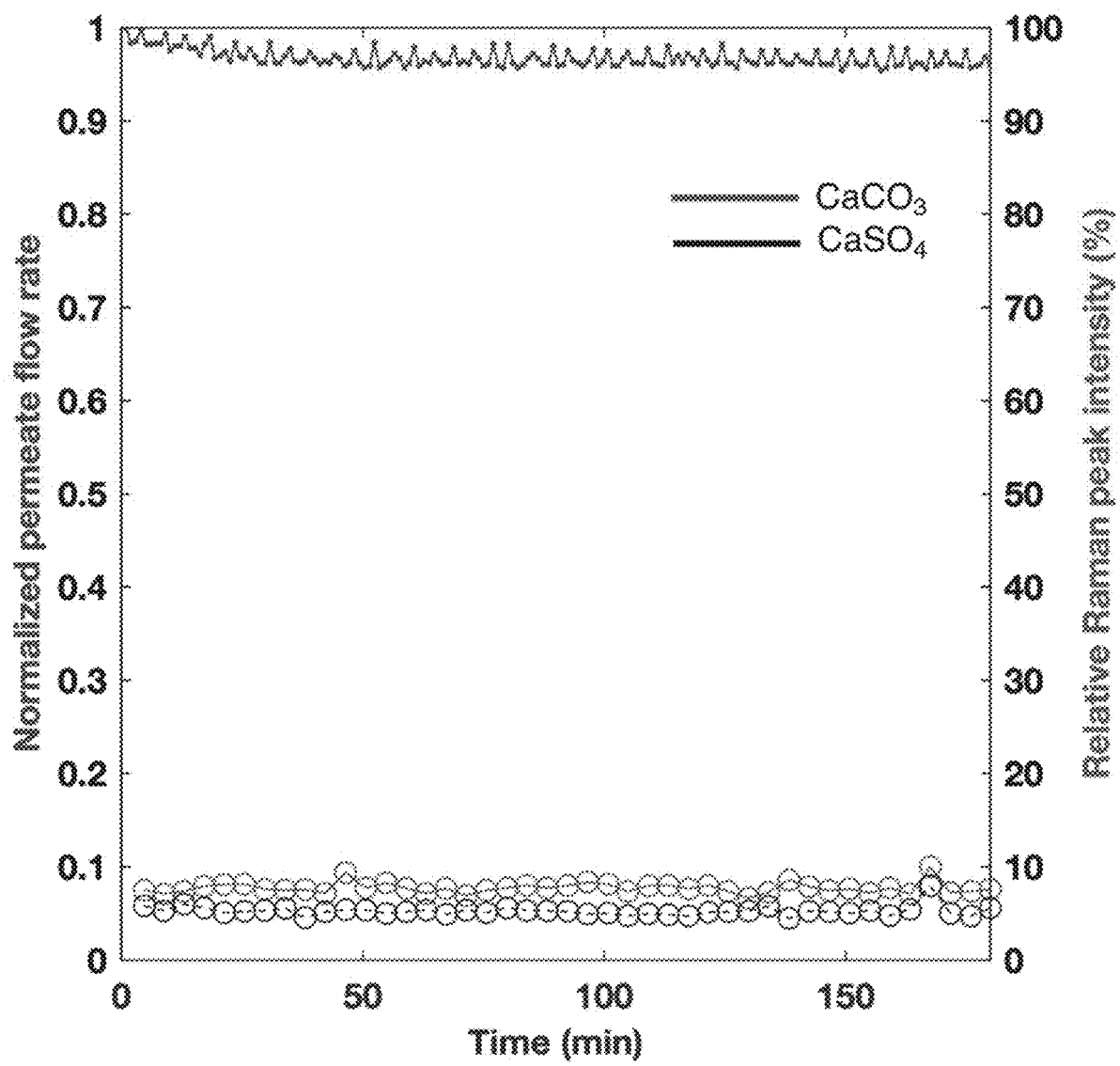
FIG. 14 illustrates a permeate flow rate and Raman signal intensity results from DI water test of Example 4. Data indicate a 7.0% decrease in the permeate flow with no detection of scaling during the 183 min. test.
Figure 15B:
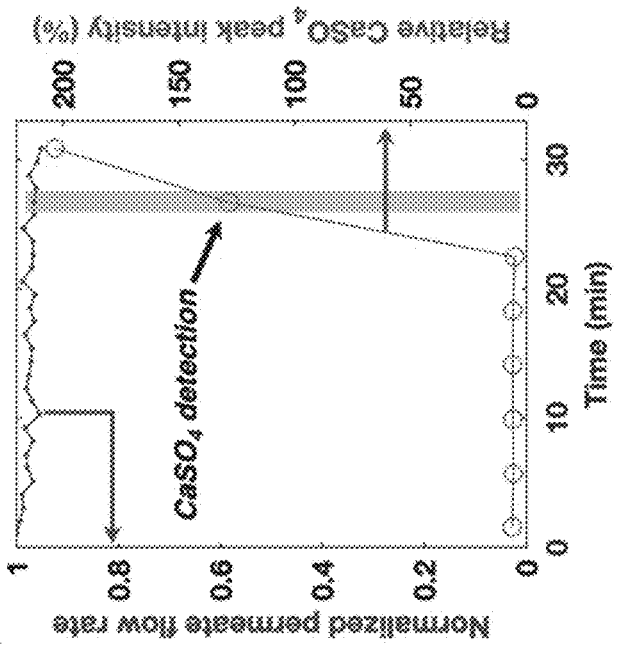
FIG. 15B illustrates permeate flow rate and Raman $CaSO_4$ signal intensity for test 8 of Example 4.
Figure 15A:
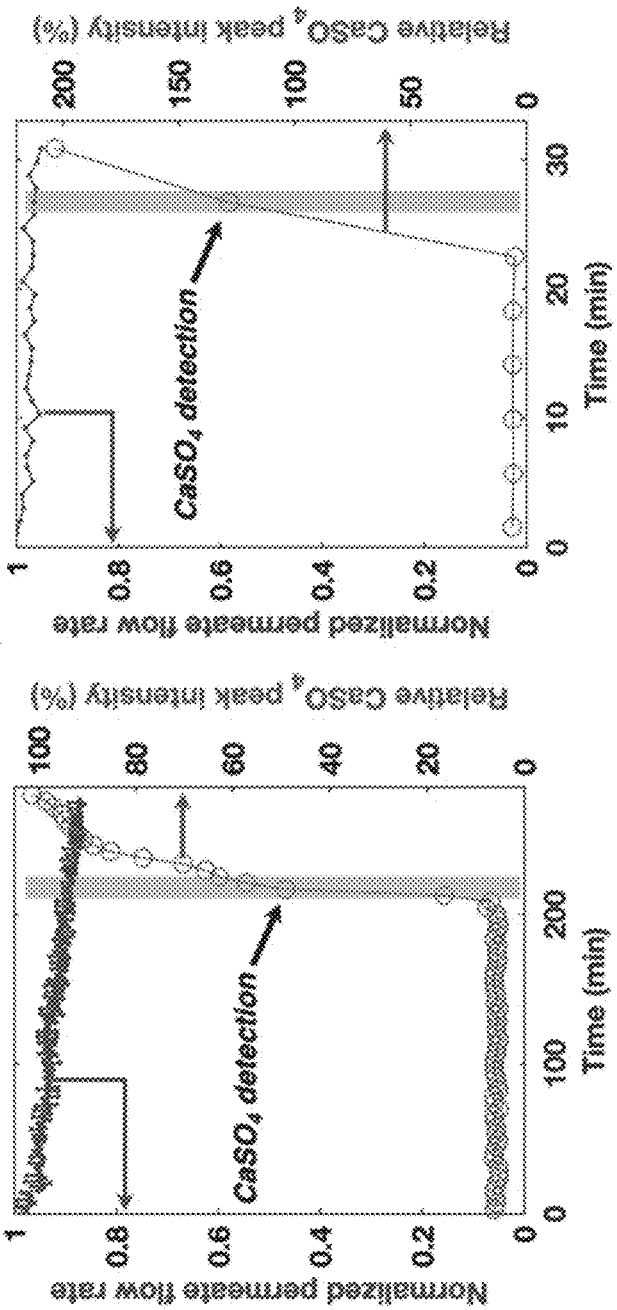
FIG. 15A illustrates permeate flow rate and Raman $CaSO_4$ signal intensity for test 5 of Example 4.
Figure 15D:
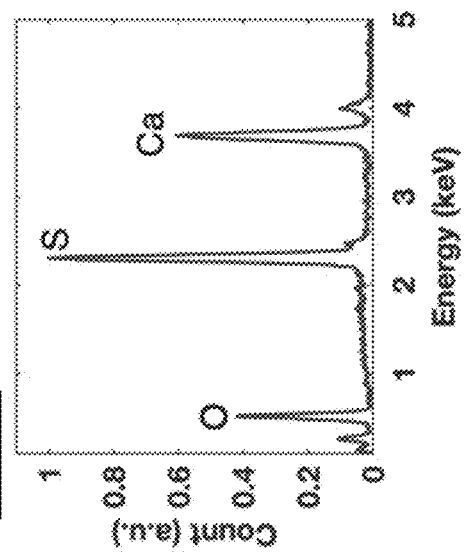
FIG. 15D depicts a corresponding EDS spectrum for test 6 of Example 4.
Figure 15C:
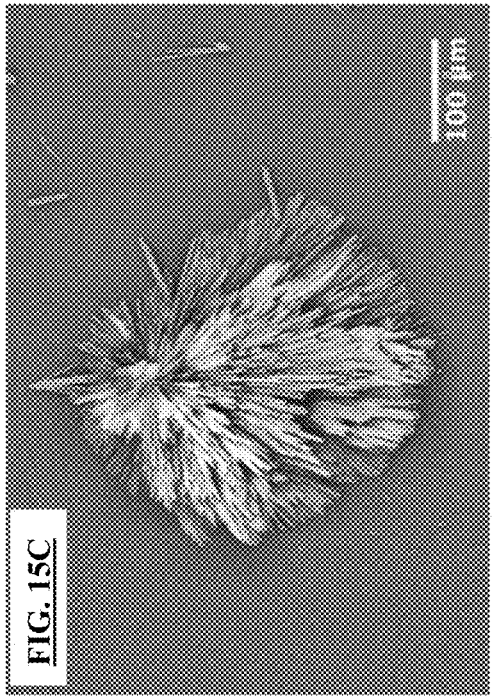
FIG. 15C depicts $CaSO_4$ scaling morphology under a Raman sensor for test 6 of Example 4.

The results indicate as much as a 13% permeate rate decrease over a 3 h period (following the initial 15-h pressurized DI water exposure) that can be reasonably attributed to membrane compaction. The differences in the permeate flow-rate reduction reflect the variability in membrane performance. Importantly, no indication of either $CaSO_4$ or $CaCO_3$ scaling was detected by Raman spectroscopy, establishing an absence of false positives from this methodology. Representative results for permeate flow rate and Raman signal intensity are shown in FIG. 14.

Calcium Sulfate Scaling Detection

To expand the initial work regarding the detection sensitivity of the Raman spectroscopy-based methodology, two sets of three independent tests were conducted with a feed concentration of 1.8 g/L $CaSO_4$. The first set used aged TFC-RO membranes while the second set employed new TFC-RO membranes. The experimental results are summarized in Table 3.

TABLE 3

Results of the CaSO₄ feed solution experiments showing detection sensitivity. CaSO₄ peak detection time is defined as the time required to detect a CaSO₄ peak with a relative intensity greater than 50%. The membranes used in test 4-6 were aged, while those in test 7-9 were new.

| Test # | Membrane condition | Total run time (min) | Permeate flow rate at the end of compaction (ml/min) | Initial permeate flow rate with CaSO₄ feed (ml/min) | CaSO₄ peak detection time (min) | Permeate flow rate reduction at detection (%) |
|---|---|---|---|---|---|---|
| 4 | Aged | 423 | 3.7 | 3.1 | 356 | 14.7 |
| 5 | Aged | 280 | 3.8 | 3.3 | 221 | 9.5 |
| 6 | Aged | 229 | 4.1 | 3.3 | 220 | 11.8 |
| 7 | New | 38 | 7.5 | 5.7 | 25 | 13.1 |
| 8 | New | 31 | 6.5 | 5.2 | 27 | 3.5 |
| 9 | New | 30 | 6.6 | 5.2 | 26 | 7.0 |

Aging can adversely affect membrane performance due to dehydration during storage that reduces wettability, which in turn decreases permeate flux. Results from these experiments show successful scaling detection for both aged and new membranes. FIGS. 15A-15D provide representative data for permeate flow rate, Raman signal intensity and post-mortem SEM characterization.

Figure 16:
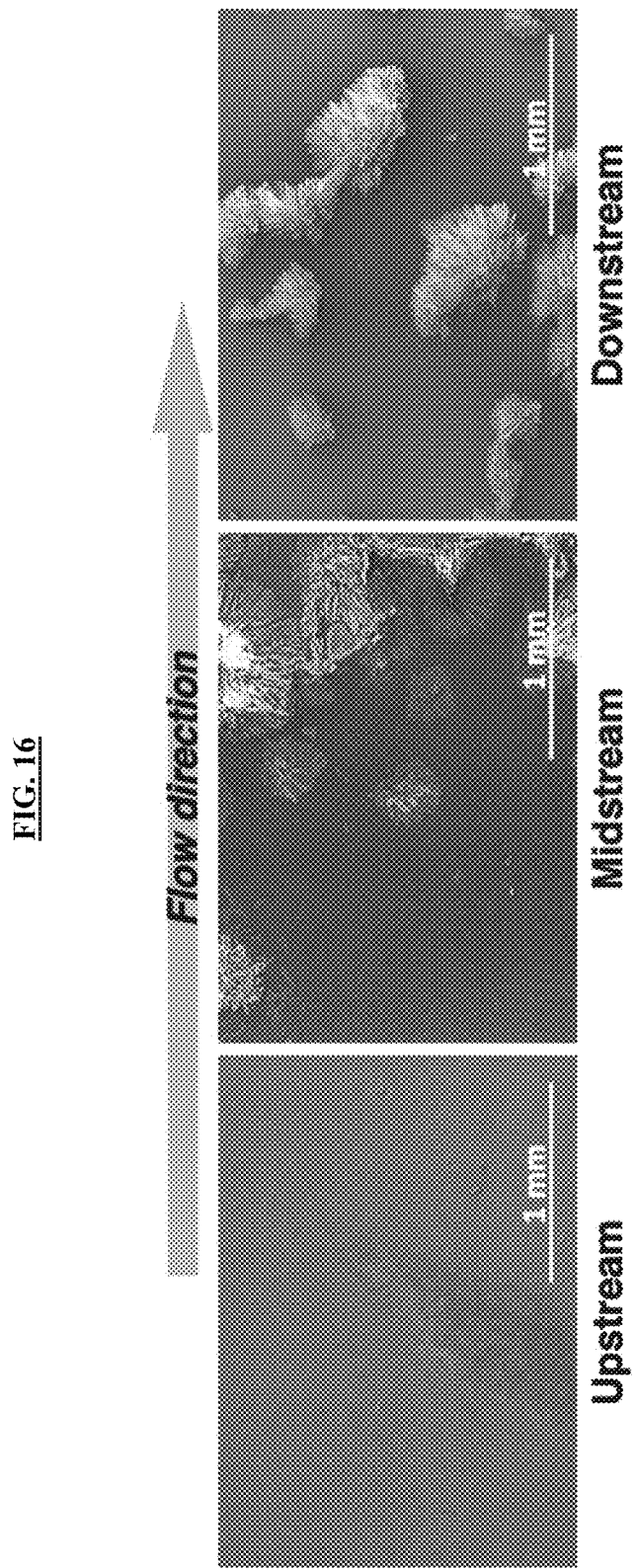
FIG. 16 depicts SEM images of the membrane from test 7 of Example 4, showing the extent of scaling upstream, midstream, and downstream.

Concentration polarization at the membrane surface is the driving force behind scaling initiation. A simplified film theory predicts the relationship between concentration polarization and permeate flux assuming negligible axial solute convection near the membrane surface. This relationship is given by, $$\frac{c_w - c_p}{c_b - c_p} = e^{\left(\frac{v_w \delta}{D}\right)}$$

where δ is the layer thickness, $v_w$ is the permeate velocity at the channel wall, D is the solute diffusion coefficient, $c_w$, $c_b$ and $c_p$ are the solute concentrations at the membrane surface, in the feed, and the permeate, respectively. The solute concentration at the membrane surface is exponentially proportional to the permeate velocity or flux. However, for sparingly soluble salts, scaling initiates when the solute concentration at the membrane surface exceeds saturation. Due to concentration polarization, the feed concentration is higher downstream, which accounts for the usual observation of downstream scaling initiation with progression in the upstream direction. Analysis of the SEM images (2.5 mm×1.7 mm) from FIG. 16 indicate 0%, 33% and 26% scalant coverage at upstream, midstream and downstream locations, respectively. The channel height at the center of the flow cell is 4 mm (e.g., 2 mm everywhere else) to accommodate the optical window clamp. This results in a lower cross-flow velocity, hence increasing the concentration polarization and scaling extent relative to the downstream region.

Figure 17:
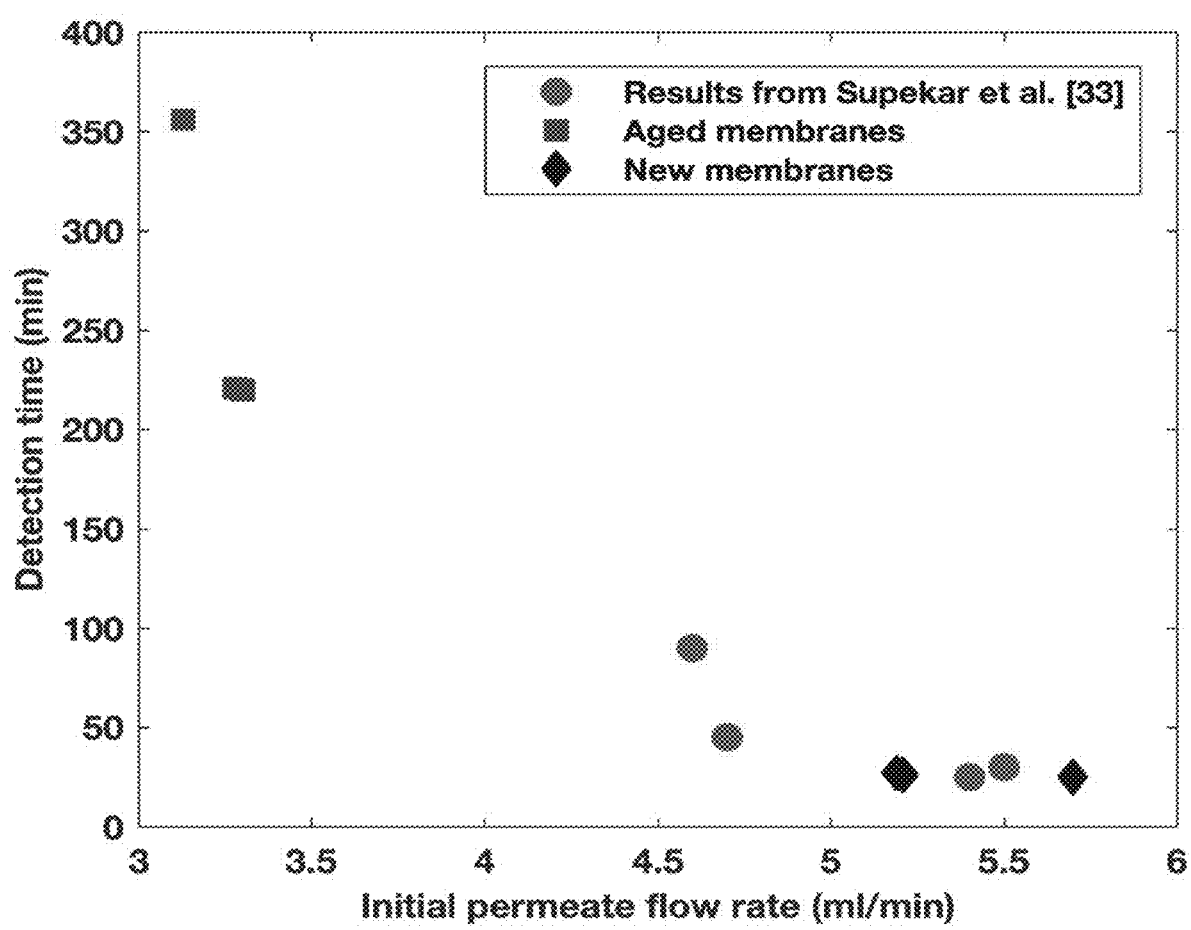
FIG. 17 depicts a graph of $CaSO_4$ scaling detection time as a function of initial permeate flow rate. The data indicate an inverse relationship between detection time and initial permeate flow rate.

The data in Table 3 summarize the inverse relationship between initial permeate flow-rate and CaSO₄ Raman peak-detection time. FIG. 17 shows the detection time as a function of initial permeate flow-rate for experiments 4-9 as well as results from the previous work in Example 1. Overall, the data indicate that in addition to sensitive detection of scaling with chemical identification, the Raman-based sensing methodology can also provide important insight regarding scaling dynamics. Clearly, such information can be expanded with the use of more sophisticated sensor sampling strategies.

Calcium Carbonate Scaling Detection

Figure 18B:
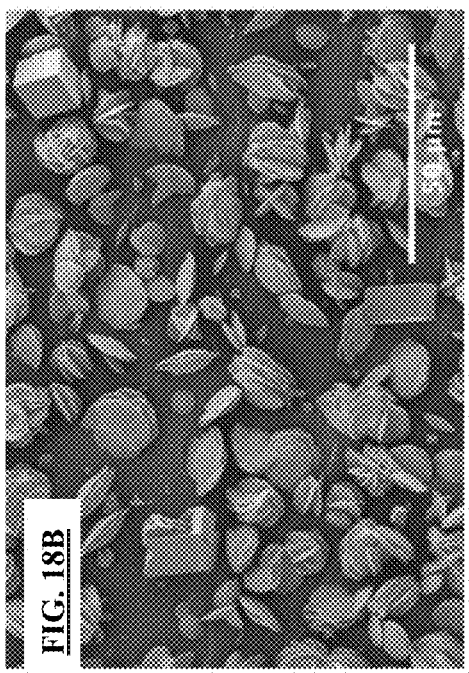
FIGS. 18A-18C illustrate.
Figure 18C:
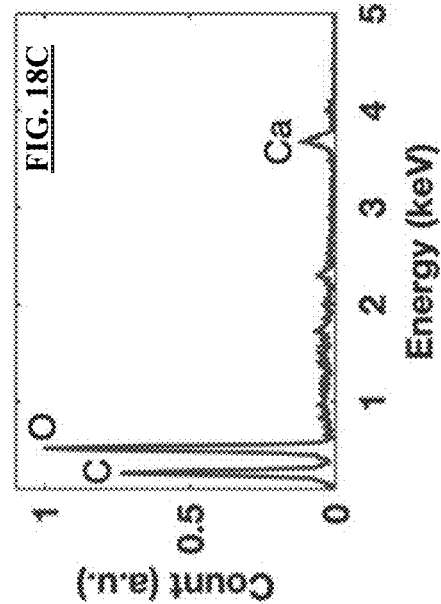
Figure 18A:
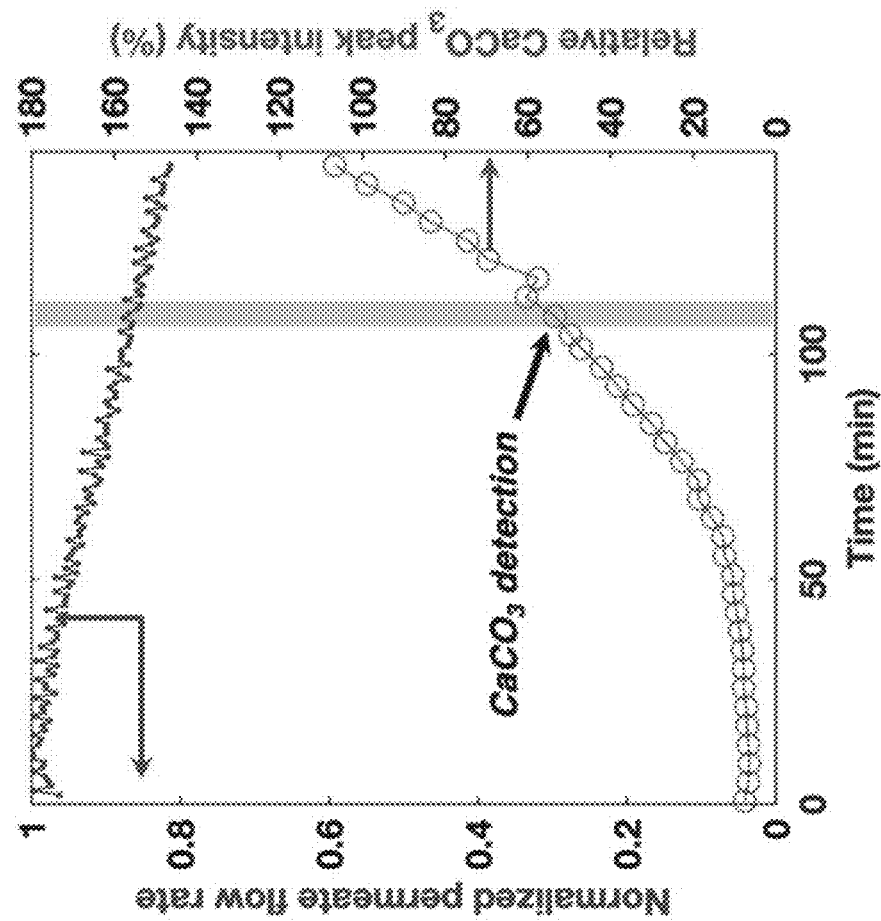

To determine the applicability of the Raman methodology to a wider range of scalants, we evaluated CaCO₃ scaling detection. Three independent experiments were each conducted using a feed solution consisting of 4.5 mM NaHCO₃ and 3 mM CaCl₂. A summary of the results from these experiments is presented in Table 4. The data shows that the Raman-based sensing technique can first detect CaCO₃ scaling at a time scale corresponding to a permeate flow-rate decrease of <13%. FIGS. 18A-18C provide representative data for permeate flow rate, Raman signal intensity and post-mortem SEM characterization from test 10.

TABLE 4

Results of the CaCO₃ feed solution experiments showing detection sensitivity.

| Test # | Total run time (min) | Permeate flow rate at the end of compaction (ml/min) | Initial Permeate flow rate with CaCO₃ feed (ml/min) | Time for CaCO₃ detection (min) | Permeate flow rate reduction at detection (%) |
|---|---|---|---|---|---|
| 10 | 142 | 6.5 | 5.2 | 108 | 12.3 |
| 11 | 147 | 5.9 | 5.1 | 135 | 11.8 |
| 12 | 126 | 6.1 | 5.3 | 93 | 12.2 |

The scaling morphology from these experiments appears to be predominately comprised of aragonite structures in the form of circular flakes with some evidence of rhombic calcite crystals. The scalant size-scale is of the same order (~10 μm) as the laser spot diameter (3 μm full width, half maximum) on the membrane surface. The increase in Raman signal intensity corresponds to the growth of the scalant. The results indicate a more gradual increase in the Raman signal intensity as compared to the CaSO₄ scaling experiments.

Figure 19:
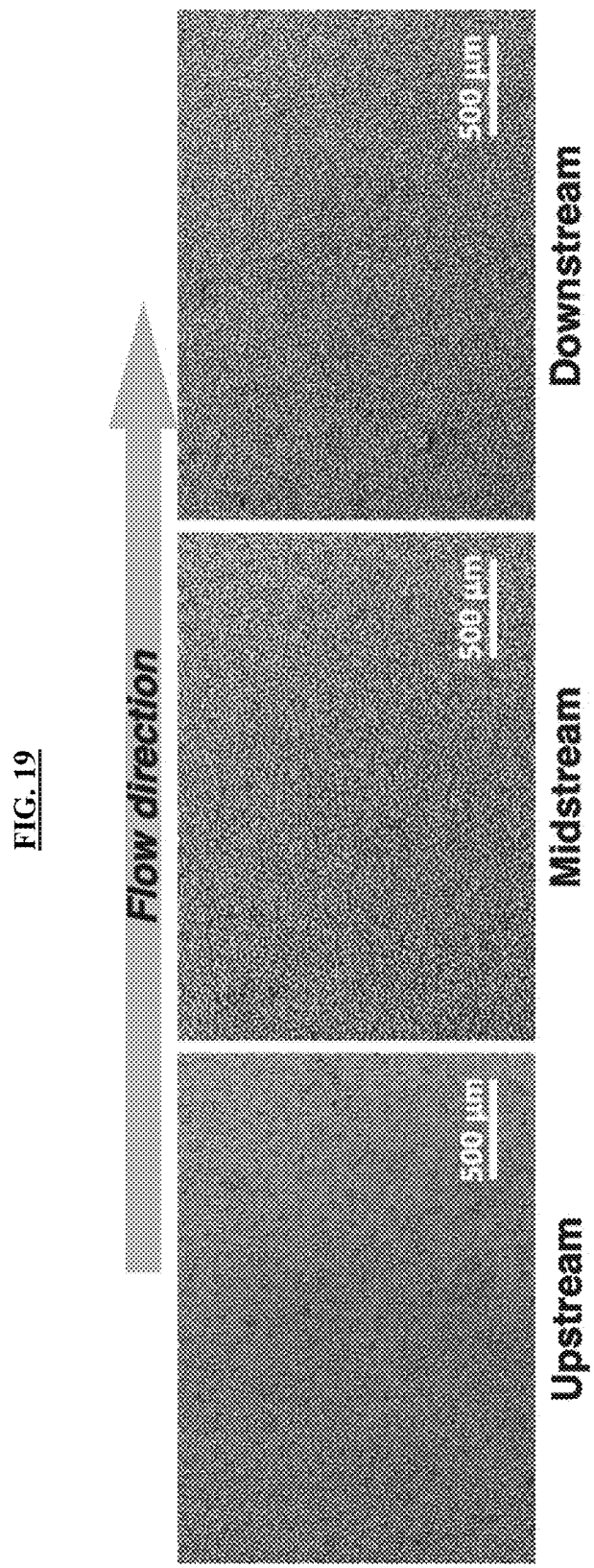
FIG. 19 depicts SEM images of the membrane from test 10 of Example 4 showing the extent of scaling upstream, midstream, and downstream.
Figure 20A:
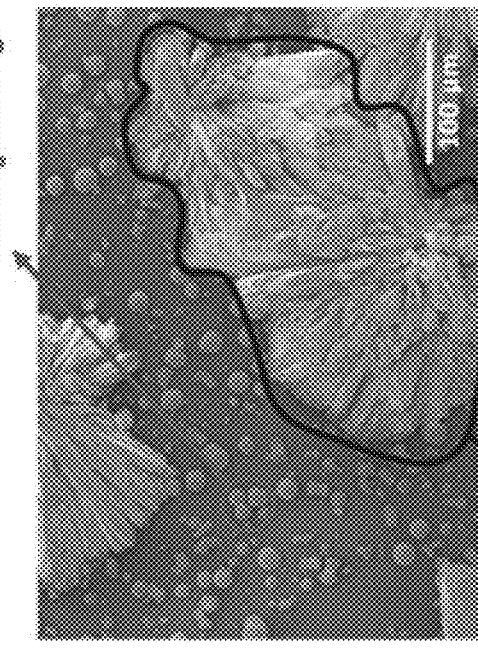
FIGS. 20A-20D illustrate.
Figure 20B:
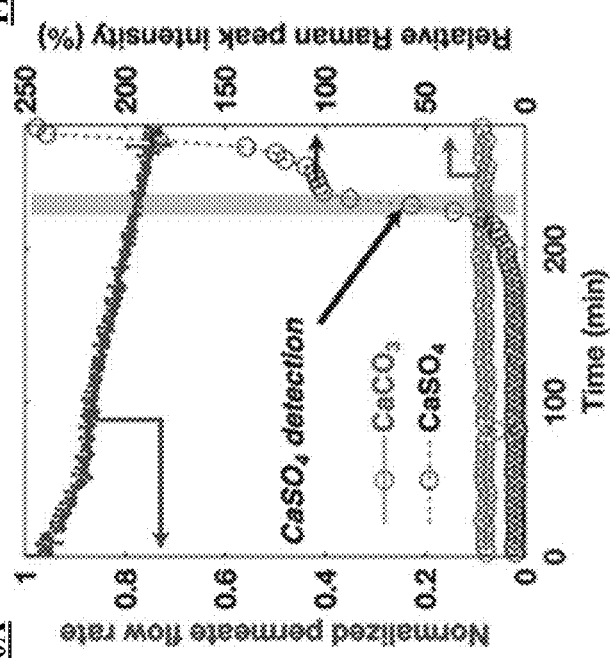
Figure 20C:
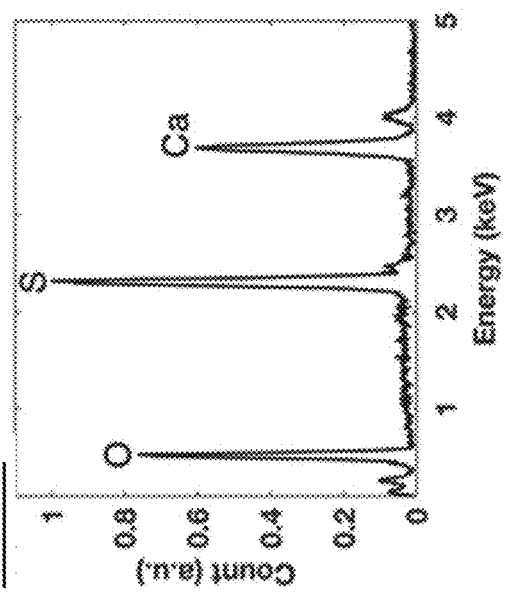
Figure 20D:
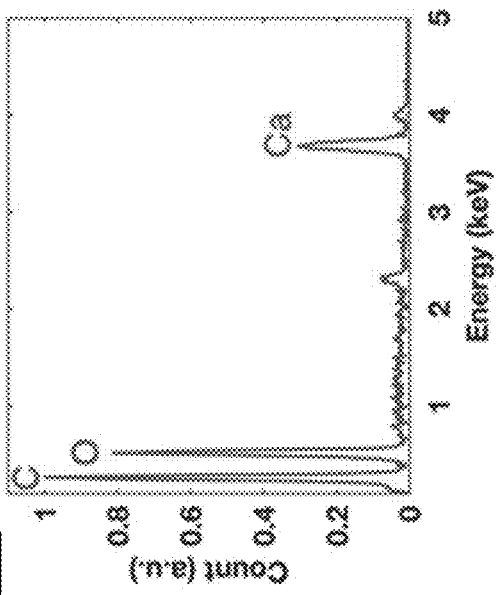

The effect of concentration polarization on the membrane surface along the flow direction is less pronounced than with CaSO₄ because of the supersaturated CaCO₃ feed concentration. This is confirmed by post-mortem SEM imaging at locations upstream, midstream and downstream (FIG. 19) at which scalant coverage is 33%, 45% and 41%, respectively.

Mixed-Feed Scaling Detection

For maximum utility the Raman methodology must be capable of detecting multiple scalants in sea water, brackish water, or other fluid mixtures. A scaling experiment with a mixed-feed solution containing both $CaSO_4$ and $CaCO_3$ was thus conducted to assess the wider applicability of the methodology. The feed solution had a concentration of 1.8 g/L $CaSO_4$, 4.5 mM $NaHCO_3$ and 3 mM $CaCl_2$. After 228 min, $CaSO_4$ scaling was detected corresponding to a permeate flow-rate reduction of 22.8%. FIGS. 20A-20D show the permeate flow-rate variation, Raman signal progression and post mortem SEM and EDS characterization results from test 13.

Figure 21A:
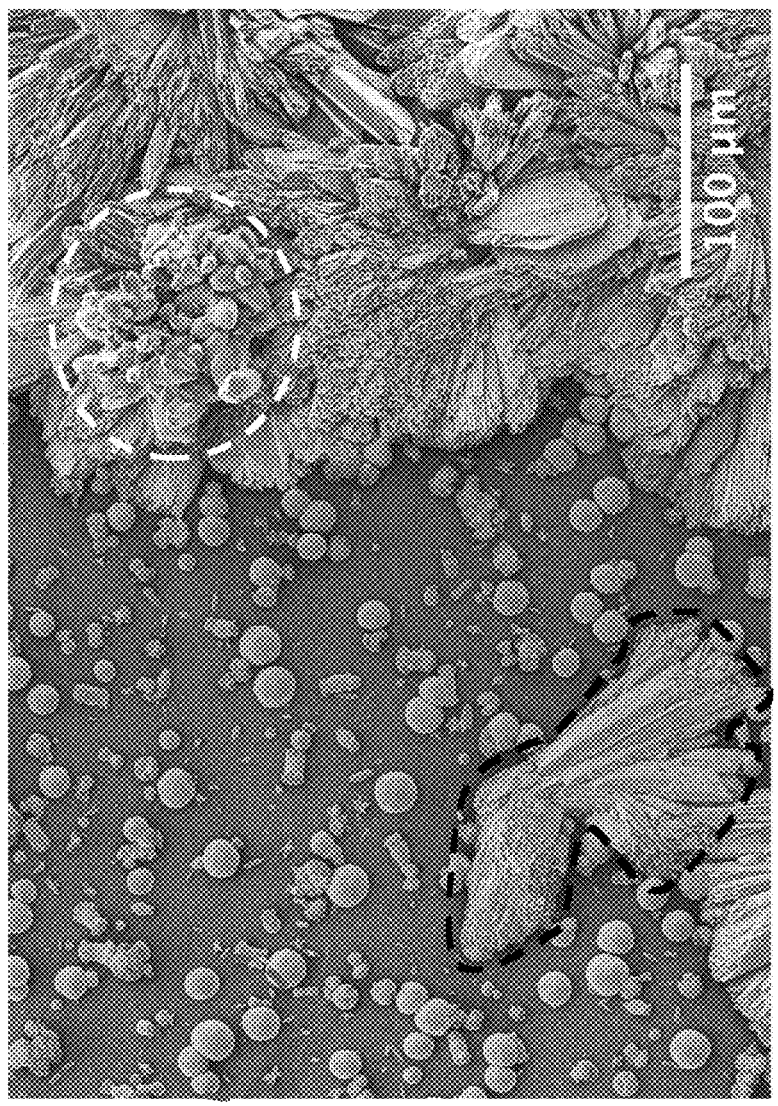
FIGS. 21A-21C illustrate.

The co-precipitation of $CaCO_3$ and $CaSO_4$ is governed by the scaling dynamics of $CaCO_3$ whereby the $CaCO_3$ would nucleate first in a supersaturated mixed feed. However, given the difference in crystal size between $CaSO_4$ (100's of μm) and $CaCO_3$ (10's of μm) (FIG. 20B), there is a much higher probability that $CaSO_4$ crystals will grow under the small area interrogated by the fixed-coordinate Raman laser beam. It is important to note that detection will also occur if $CaCO_3$ nucleates under the sensor instead of $CaSO_4$. In addition, detection of both $CaSO_4$ and $CaCO_3$ in this fixed laser-beam arrangement can occur if $CaSO_4$ nucleates on top of the $CaCO_3$ or vice versa (FIG. 21A). This is clearly a limitation of the single-point sensing arrangement currently employed. This shortcoming can be addressed by utilizing a more sophisticated sampling strategy such as one interrogating a larger area.

Figure 21C:
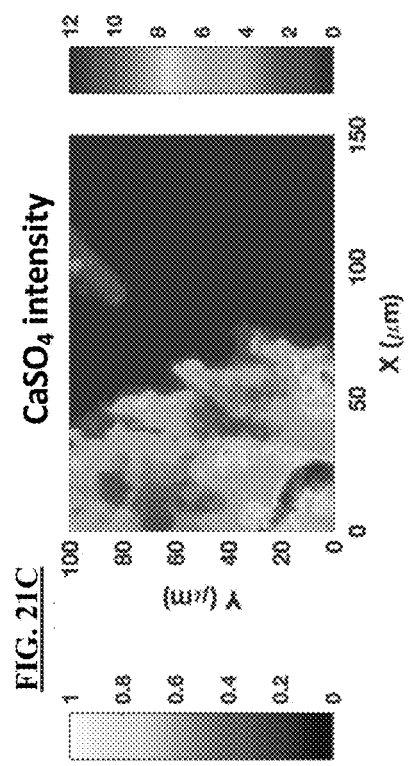
Figure 21B:
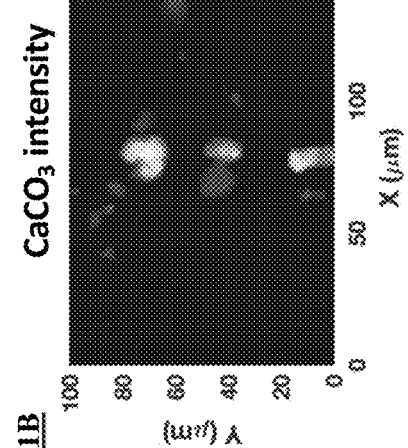

Initial results for scalant detection over a larger area were obtained from a post-mortem scan on the test 13 membrane using the inVia stage. The scans (FIGS. 21B and 21C) were conducted over a 150×100 μm² area comprising a representative portion of the region shown in FIG. 21A. Results show that both scalants with chemical identification can be detected using Raman spectroscopy.

Surface Sampling Strategies

Certain embodiments of the claimed invention can allow for different scanning strategies for the detection of scalants and non-scalants such as biofouling. For example, the Raman microscope of any of the systems discussed above can scan (e.g., raster) or capture several Raman emissions from different locations of a sampled membrane. This can be achieved by repositioning the Raman microscope in relation to the membrane, repositioning the membrane in relation to the Raman microscope, refocusing the objective lens of the Raman microscope, steering the direction of interrogating optical beam(s), or a combination thereof. A large or multiple scan area can be beneficial in the detection of various-sized scalants (e.g., $CaCO_3$ and $CaSO_4$, etc.) and various scalant morphologies.

Real-Time Detection and Cleaning of Membrane

Figure 22:
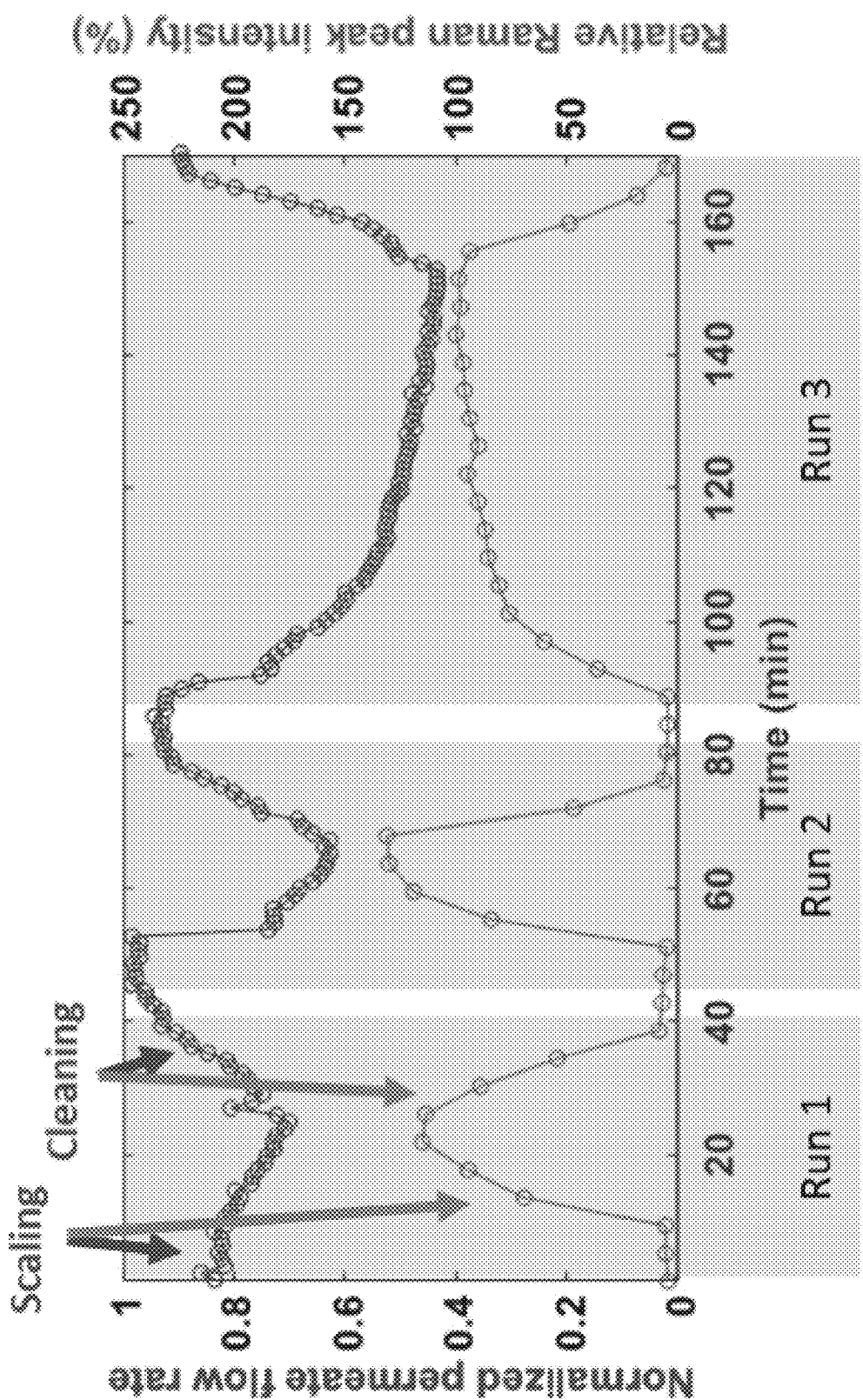
FIG. 22 illustrates a graph of normalized permeate flow rate vs. time, and relative Raman peak intensity vs. time, as measured in a separation system according to an embodiment of the claimed invention.

Certain embodiments of the claimed invention can provide for a real-time detection of membrane fouling and membrane cleaning. FIG. 22 depicts a graph of normalized permeate flow rate and relative Raman peak intensity vs. time, according to an embodiment of the claimed invention. A permeate flow rate of a separation system with integrated Raman spectroscopy was monitored and measured over a specified period time. Separately, the Raman peak intensity of the system was also measured over the specified period of time. As shown in the graph, maximum Raman peak intensity coincided with minimum normalized permeate flow rate. Further, minimum Raman peak intensity coincided with maximum normalized permeate flow rate. It was thus observed that as scaling of the membrane of the system increases, permeate flow rate of the system decreases, and vice versa.

Additionally, cleaning techniques were implemented at various intervals (e.g., alternating with running operation times of the system), where cleaning solutions were introduced into the system to clean the membrane. The cleaning process was observed as the permeate flow rate increased and the Raman peak intensity decreased, indicating that scalants formed on the membrane were removed during the cleaning process. As the system returned to an operating time interval (e.g., the cleaning solutions were removed from the system), it can be seen that scalants again build up on the membrane, thereby decreasing the permeate flow rate and increasing the Raman peak intensity of the system. Thus, by monitoring the permeate flow rate and Raman peak intensity of a separation system, optimal cleaning times can be determined to increase overall efficiency of the system and increase the lifetime of the implemented membranes.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method of detecting and characterizing fouling of a membrane used for separation in a fluid-based system, the method comprising:
    illuminating the membrane with one or more light sources;
    collecting Raman spectroscopy data from the membrane; and
    based on the Raman spectroscopy data, determining at least one selected from the group consisting of: presence or absence of membrane fouling, severity or thickness of membrane fouling, and composition of the membrane fouling;
    wherein the Raman spectroscopy is selected from the group consisting of Coherent Anti-Stokes Raman Scattering (CARS), Stimulated Raman Scattering (SRS), and spontaneous Raman Scattering.

2. The method of claim 1, wherein the membrane fouling is membrane scaling.

3. The method of claim 1, wherein the membrane fouling comprises deposition on the membrane, or in a set of pores of the membrane, of a material selected from the group consisting of calcium salts, sulfate salts, magnesium salts, sodium salts, potassium salts, barium salts, strontium salts, aluminum salts, iron salts, carbonate salts, hydroxides, fluoride salts, chloride salts, bromide salts, polysaccharides, proteins, lipids, colloidal iron compounds, colloidal silicon compounds, colloidal aluminum compounds, and at least one organism.

4. The method of claim 3, wherein the deposition on the membrane further comprises at least two materials of the group, wherein the determining further comprises determining the composition of the two materials.

5. The method of claim 1, wherein the membrane comprises at least one selected from the group consisting of a polyamide, polyether sulfone (PES), polydimethyl siloxane, cellulose acetate (CA), polyacrylonitrile (PAN), polyamides, polyamide-imide (PI), polyethylene (PE), polypropylene (PP), polysulfone (PS), polytetrafluoroethylene (PTFE), polyvinylidene difluoride (PVDF), tungsten, palladium, stainless steel, aluminum, titanium, a metal oxide, a metal nitride, a metal carbide, and a zeolite material.

6. The method of claim 1, wherein the membrane is a thin film composite (TFC) membrane.

7. The method of claim 1, wherein the fluid-based system is at least one selected from the group consisting of a water desalination system, a waste water system, a biofiltration system, a gas separation system, a pharmaceutical separation system, a food or beverage separation system, a liquid carbon dioxide separation system, an organic solvent separation system, whereby such systems consist of one or more microfiltration (MF) membranes, ultrafiltration (UF) membranes, nanofiltration (NF) membranes and hyperfiltration (RO) membranes.

8. The method of claim 1, wherein the one or more light sources are two lasers, each having a different frequency.

9. The method of claim 8, wherein the frequency difference of the two lasers corresponds to a molecular vibration frequency of a membrane fouling compound.

10. The method of claim 1, wherein the Raman spectroscopy data are collected using a spectrometer and a camera.

11. The method of claim 1, wherein the CARS is implemented using at least one dual comb laser source.

12. The method of claim 1, wherein the membrane is illuminated through at least one optical window that allows transmission of the at least one light source.

13. The method of claim 1, further comprising:
scanning a frequency difference between the one or more light sources, wherein the Raman spectroscopy data is collected using a photodetector.

14. An apparatus for detecting and characterizing fouling in a fluid-based system, the apparatus comprising:
a flow cell defining a cavity;
a separation membrane positioned within the cavity; and
a Raman microscope comprising one or more light sources, the Raman microscope configured or adapted to:
illuminate the membrane with the one or more light sources;
collect Raman spectroscopy data from the membrane; and
based on the Raman spectroscopy data, determine at least one selected from the group consisting of: presence or absence of membrane fouling, severity of membrane fouling, and composition of the membrane fouling;
wherein the Raman spectroscopy is selected from the group consisting of Coherent Anti-Stokes Raman Scattering (CARS), Stimulated Raman Scattering (SRS), and spontaneous Raman Scattering.

15. The apparatus of claim 14, wherein the membrane fouling is membrane scaling.

16. The apparatus of claim 14, wherein the membrane fouling comprises deposition on the separation membrane, or in a set of pores of the separation membrane, of a material selected from the group consisting of calcium salts, sulfate salts, magnesium salts, sodium salts, potassium salts, barium salts, strontium salts, aluminum salts, iron salts, carbonate salts, hydroxides, fluoride salts, chloride salts, bromide salts, polysaccharides, proteins, lipids, colloidal iron compounds, colloidal silicon compounds, colloidal aluminum compounds, and at least one organism.

17. The apparatus of claim 16, wherein the deposition on the separation membrane further comprises at least two materials of the group, wherein the determining further comprises determining the composition of the two materials.

18. The apparatus of claim 14, wherein the separation membrane comprises at least one selected from the group consisting of a polyamide, polyether sulfone (PES), polydimethyl siloxane, cellulose acetate (CA), polyacrylonitrile (PAN), polyamides, polyamide-imide (PI), polyethylene (PE), polypropylene (PP), polysulfone (PS), polytetrafluoroethylene (PTFE), polyvinylidene difluoride (PVDF), tungsten, palladium, stainless steel, aluminum, titanium, a metal oxide, a metal nitride, a metal carbide, and a zeolite material.

19. The apparatus of claim 14, wherein the fluid-based system is at least one selected from the group consisting of a water desalination system, a waste water system, a biofiltration system, a gas separation system, a pharmaceutical separation system, a food or beverage separation system, a liquid carbon dioxide separation system, an organic solvent separation system, whereby such systems consist of one or more microfiltration (MF) membranes, ultrafiltration (UF) membranes, nanofiltration (NF) membranes, and hyperfiltration (RO) membranes.

20. A method of monitoring severity or thickness of fouling of a membrane used for separation in a fluid-based system, the method comprising:
illuminating the membrane with one or more light sources;
collecting Raman spectroscopy data from the membrane; and
based on the Raman spectroscopy data, determining severity or thickness of membrane fouling;
wherein the Raman spectroscopy is selected from the group consisting of Coherent Anti-Stokes Raman Scattering (CARS), Stimulated Raman Scattering (SRS), and spontaneous Raman Scattering.

* * * * *